United States Patent [19]
Botzenhardt et al.

[11] Patent Number: 5,901,156
[45] Date of Patent: * May 4, 1999

[54] METHOD OF PROCESSING MESSAGES TO BE TRANSMITTED FOR A DATA PROCESSING ARRANGEMENT

[75] Inventors: Wolfgang Botzenhardt, Göppingen; Siegfried Dais, Gerlingen; Uwe Kiencke, Ludwigsburg; Martin Litschel, Vaihingen/Enz 2; Wolfgang Krampe, Rennigen 2, all of Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/465,059

[22] Filed: Jun. 5, 1995

Related U.S. Application Data

[62] Division of application No. 08/185,024, Jan. 24, 1994, Pat. No. 5,640,511, which is a division of application No. 07/856,430, Mar. 23, 1992, Pat. No. 5,303,348, which is a continuation of application No. 07/511,080, Apr. 19, 1990, abandoned, which is a continuation of application No. 06/831,475, Feb. 20, 1986, Pat. No. 5,001,642.

[30] Foreign Application Priority Data

Feb. 22, 1985 [DE] Germany ............... 35 06 118

[51] Int. Cl.$^6$ .................................................. G08C 25/02
[52] U.S. Cl. .............................. 371/32; 371/33; 455/505; 455/524; 380/9; 380/20; 380/49
[58] Field of Search ....................... 371/32, 33; 370/85.6, 370/85.4; 340/825.5, 825.51; 364/131, 132, 200; 395/575, 303, 650, 732, 725; 375/347; 380/9, 20, 49; 455/505, 524

[56] References Cited

U.S. PATENT DOCUMENTS 3,680,053  7/1972  Cotton et al. ............... 340/172.5
4,231,086  10/1980  Tarbox et al. ............... 364/200
4,275,095  6/1981  Nadir ........................... 364/200

(List continued on next page.)

FOREIGN PATENT DOCUMENTS 0014556  8/1980  European Pat. Off. .
0023105  1/1981  European Pat. Off. .
0068977  1/1983  European Pat. Off. .
0117832  9/1984  European Pat. Off. .
0208998  1/1987  European Pat. Off. ............... 364/131

(List continued on next page.)

OTHER PUBLICATIONS

8181 New Electronics 17 (1984) Apr., No. 8, London, U.K., pp. 27 to 28, 31 and 33, "D$^2$B–A Digital Data Bus for Small Area Networks".

"Multiprocessor implementation of the logic function of a multiplexed wiring system for automotives" 8049 I.E.E. Proceedings Section A a I, vol. 129 (1982), Nov., No. 6, Part E.

(List continued on next page.)

*Primary Examiner*—Reba I. Elmore
*Assistant Examiner*—McDieunel Marc
*Attorney, Agent, or Firm*—Walter Ottesen

[57] ABSTRACT

A method is disclosed for the operation of a data processing system for motor vehicles including at least two computers and a line connecting the computers for the transmission of messages. This line permits a fast and reliable data transmission between the computers installed in the motor vehicle, taking into account the specific requirements of a controller-coupling in the motor vehicle. An embodiment is provided which describes in detail the interface between the individual computers and the line linking the computers, and with the aid of which a controller-coupling is realized in the vehicle.

16 Claims, 28 Drawing Sheets

U.S. PATENT DOCUMENTS

| | | |
|---|---|---|
| 4,319,338 | 3/1982 | Gradowski et al. ............... 364/131 |
| 4,366,479 | 12/1982 | Mori et al. ............... 340/825.05 |
| 4,412,285 | 10/1983 | Neches et al. ............... 364/200 |
| 4,414,949 | 11/1983 | Hönig et al. ............... 123/479 |
| 4,463,445 | 7/1984 | Grimes ............... 364/900 |
| 4,547,850 | 10/1985 | Genma ............... 364/200 |
| 4,556,943 | 12/1985 | Pauwels et al. ............... 364/431.09 |
| 4,561,092 | 12/1985 | Shaver ............... 340/825.5 X |
| 4,584,487 | 4/1986 | Hesse et al. ............... 370/85.6 X |
| 4,592,049 | 5/1986 | Killat et al. ............... 370/85.6 X |
| 4,604,748 | 8/1986 | Sato ............... 371/38 |
| 4,622,682 | 11/1986 | Kumakura ............... 375/58 |
| 4,652,873 | 3/1987 | Dolsen et al. ............... 340/825.5 |
| 4,654,655 | 3/1987 | Kowalski ............... 340/825.5 X |
| 4,680,583 | 7/1987 | Grover ............... 340/825.5 X |
| 4,715,031 | 12/1987 | Crawford et al. ............... 370/85 |
| 4,745,600 | 5/1988 | Herman et al. ............... 340/825.5 X |
| 4,814,979 | 3/1989 | Neches ............... 364/200 |
| 4,945,471 | 7/1990 | Neches ............... 364/200 |
| 5,131,081 | 7/1992 | Mackenna et al. ............... 395/275 |

FOREIGN PATENT DOCUMENTS

| | | |
|---|---|---|
| 2554775 | 6/1977 | Germany . |
| 3001331 | 7/1981 | Germany . |
| 3111135 | 11/1982 | Germany . |
| 5616224 | 2/1981 | Japan . |
| 5857942 | 12/1983 | Japan . |
| 5940728 | 3/1984 | Japan . |
| 0070851 | 4/1984 | Japan ............... 123/480 |
| 0232363 | 10/1986 | Japan ............... 123/480 |
| 527547 | 8/1972 | Switzerland . |
| 2039396 | 8/1980 | United Kingdom ............... 123/480 |

OTHER PUBLICATIONS

Valvo, serielle I$^2$C–Bus–Schnittstelle bei der Mikrocomputer–Familie 8400, by J. Koch, pp. 1 to 23.

Fourth International Conference on Automotive Electronics, 14–18th Nov., 1983, pp. 160 to 164, Institution of Electrical Engineers.

Bussysteme by G. Färber, pp. 100, 101, 104 to 108, 110 to 115 and 119 to 121, R. Oldenbourg Verlag Munich Vienna 1984.

VDI–Berichte 515, Elektronik im Kraftfahrzeug, pp. 227 to 235, 1984.

I$^2$C bus in consumer applications, Electronic Components and Applications, vol. 5, No. 4, pp. 214 to 221, Sep. 1983.

Bus–System im "Motorcar", Elektronik Applikation, 1983, No. 5, pp. 7, 8, 17, 18, 21.

"Der Inter–Intelligence–Bus" by Rainer Kind, Elektronik 10, 1982, pp. 104 to 106.

SAE Technical Paper Series 840,317, "A Small Area Network for Cars" by Ronald L Mitchell, 1984.

SAE Technical Paper Series 840,441, "Flame Arrival Sensing Fast Response Double Closed Loop Engine Management", by Michael G. May, 1984.

FIG. 6
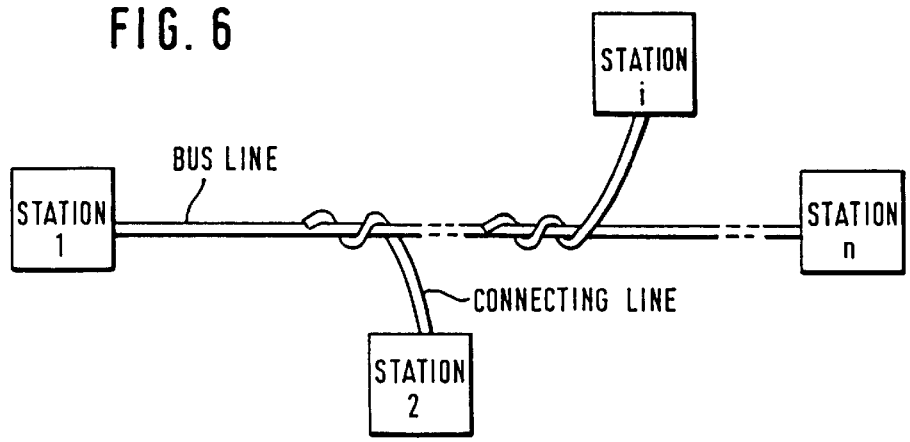
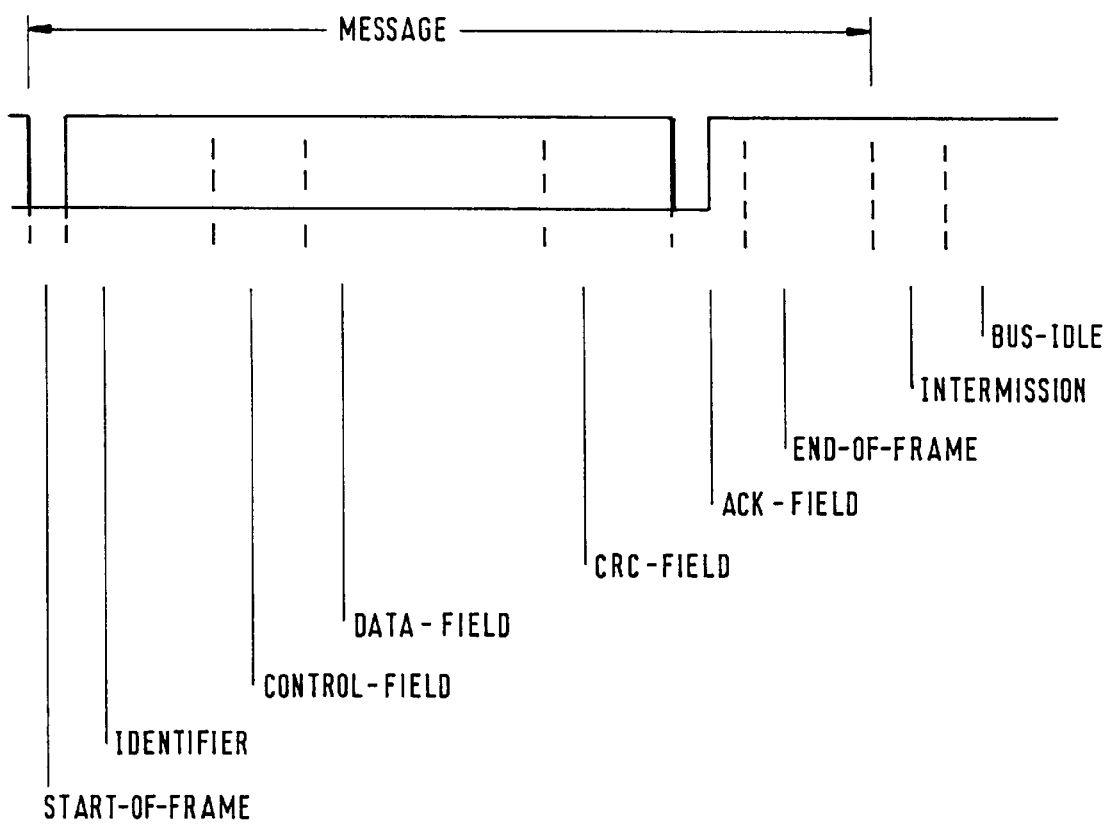
FIG. 7

FIG. 19

```
 ACK           |           |
  |            |           |
 FZ23456   123456789R
 -a            ------------         -  ---    ---  ----         ----    --
  |            |           |
  |            |           |
 -*******
  |            |           |                   ---    -    --         -----    --
  |            |           |
  |            |           |
 BZ23456   123456789R
 -a            ------------                    ---    ---   --         ----    --
  |            |           |
  |            |           |
 -*******
  |            |           |                   ---    -    --         -----    --
  |            |           |
  ||           |           |
 FZ 23456 123456789R
 -             ------------                    ---    --    -          -----    --
  | |          |           |
 -#******
  | |          |           |                   ---    --    -          -----    --
```

METHOD OF PROCESSING MESSAGES TO BE TRANSMITTED FOR A DATA PROCESSING ARRANGEMENT

This is a divisional of application Ser. No; 08/185,024, filed on Jan. 24, 1994, now U.S. Pat. No. 5,640,511 which is a divisional of Ser. No. 07/856,430, filed Mar. 23, 1992 (now U.S. Pat. No. 5,303,348), which in turn is a continuation of application Ser. No. 07/511,080, filed on Apr. 19, 1990, now abandoned, which in turn is a continuation of application Ser. No. 06/831,475, filed on Feb. 20, 1986, now U.S. Pat. No. 5,001,642.

BACKGROUND OF THE INVENTION

In recent years the function of the motor vehicle has been materially improved by electronic control systems. Through the use of digital electronics in the engine, it has been possible, for example, to reduce the consumption of fuel and the emission of toxic substances. Anti-skid control systems help to reduce braking distances while at the same time maintaining the steerability of the vehicle.

In the future, further functional improvements can be achieved for the motor vehicle, particularly by intermeshing the individual control functions instead of having each function operate separately. With an electronically controlled automatic transmission, gears can be shifted, for example, with less attendant wear of the clutch linings and more smoothly if the instant the gear is changed the engine torque is temporarily reduced by a suitable intervention into the electronic engine control system.

To meet these needs, it is necessary for the computer controlling the transmission to transmit relevant data to the computer controlling the engine at precisely the right instant. Until now, this has been accomplished by means of a series of single signal lines.

In more complex systems, however, the number of such signal lines becomes too large. In this case, therefore, a fast data transmission is necessary between the computers installed in the motor vehicle which requires few connections in the controller plug and provides for the transmission of data in coded form.

For this purpose, local area networks for coupling microprocessors, minicomputers and peripheral devices have been devised in the past, particularly for communications applications. Thus, there are a large number of state-of-the-art transmission protocols for the coupling of microcomputers including, for example, DDB (1), IIC (2), MUART (3), CSMA (4), SDLC (4) and HDLC (4). In this connection, reference may be made to the following:

(1) VALVO, DDB Specification;
(2) VALVO, Technische Informationen fur die Industrie 811215;
(3) INTEL, Microprocessor and Peripheral Handbook, 1983; and,
(4) A. Tannenbaum, Computer Networks, Prentice Hall International, 1981.

DISADAVANTAGES OF THE STATE-OF-THE-ART

In the protocols identified above, the requirements of a controller coupling in the motor vehicle are not satisfied sufficiently.

While in communications and computer engineering larger packets are conventionally transmitted, the typical packet lengths in motor vehicle applications are small. In the vehicle, the data exchanged between control units, sensors and final control elements preferably relates to measured values, intermediate results of algorithms and synchronizing signals. Devising a transmission protocol suitable for these applications necessarily leads to different results.

Control units in the vehicle operate in a real-time environment, that is, the computer operations and control interventions have to be executed within specific time frames, in step with the processes. For the local area network, this means that the transmission line has to be free for important. messages after a short latent time (typically of 200 microseconds) in order to avoid excessive delays.

By contrast, in the standardized Ethernet protocol, alone the transmission of a single message requires at least 580 microseconds in spite of the high transfer rate of 10 MHz. Only after this period is the bus free for the transmission of further messages. If then several bus users start transmitting at the same instant, a collision of messages in the network will result. This access conflict is solved by all stations being required to step back and try again after a statistical waiting time. By these means, however, the repeated occurrence of bus access conflicts cannot be ruled out. As a result, the strict time limits to be adhered to in vehicular control units cannot be kept reliably.

Motor vehicles come equipped with a variety of customized options. Therefore, the possibility must exist to change the configuration of a local area network and the number of its users easily. It is particularly important in this connection that the computers already linked to the network can continue operating with the program unchanged if the function they perform remains unchanged. The transmission system has to be configured such that, beyond the existing functional links between the control units, no further dependent relationships imposed by the bus protocol have to be introduced. None of the known interface modules satisfies this requirement.

With DDB, for example, each message contains the addresses of both the transmitting and the receiving stations. With the addition of another network user also requiring the data already transmitted on the bus, the already existing users have to add the new address to their list. Moreover, the data already transmitted to other users has to be sent to the new users, too. Although not required by the logical structure, a large number of program variants is thus obtained.

Many known networks (based on INTEL Microprocessor 8044, HDLC/SDLC protocol, for example) operate according to the master/slave system, that is, only one user (the master) is authorized to have access to the bus at a time. This obviates the need for an otherwise necessary bus arbitration.

Generally, all bus users become masters in succession. In automotive applications, however, such a procedure is disadvantageous because a user can only transmit if so authorized. This may result in intolerably long waiting periods for the slaves until a high-priority message can be transmitted.

The master/slave principle is also disadvantageous in the event of electromagnetic interferences as they are known to occur in motor vehicles. In such an event, for example, the authorization to transmit may be lost or another user may be erroneously authorized to transmit simultaneously.

While it is generally possible to handle such disturbances, they require considerable time (bus down time, CPU computing time) and a complex hardware/software configuration which is not allowable in view of the real-time requirements of the control units.

Many known networks have the problem of synchronizing events. For example, if the transmission of a message is to produce a response from two or more users simultaneously, it is necessary for the message to be received by all users at precisely the same instant. In the customary sequential transmission of messages to the individual destinations (point-to-point connection), the simultaneity of reception of a valid message is principally not achievable.

Motor vehicle networks often require identical messages to be sent to various destinations. Simultaneous reception of these messages at all destinations would substantially increase network availability. This procedure, however, is not supported by the known interface modules.

Networks in motor vehicles operate in an environment which is subject to extremely heavy interference. To reduce unidentified transmission errors, an efficient error detecting system is therefore required permitting a transmission to be repeated if so necessary. Simple algorithms such as the additional transmission of sum check bits detect only individual errors and are inadequate for motor vehicle applications where the interferences predominantly occur in bunches.

Even the more complex protocols known today are not in a position to ensure sufficient transmission reliability in the motor vehicle without the provision of additional safeguarding programs on the user level (multiplex transmission, for example). In the HDLC protocol, for example, already a single bit error may produce a distorted message which cannot be detected although the message is protected by a 16-bit cyclic redundancy check.

In order to be able to retransmit a message if an error condition has occurred, it is necessary for the source to receive an acknowledgment from all destinations. As explained above, it is a substantial advantage if the messages can be received by several users simultaneously. The subsequent acknowledgments, however, must not be made in single sequential messages or part messages as is the case in known protocols. Accordingly, consistent and simultaneous processing of the data by the bus users addressed cannot be ensured in this case.

Interferences in motor vehicles often act only locally. Because of the finite propagation velocity of electromagnetic waves, it may happen, for example, that only part of the receiving stations samples invalid levels on the bus at a specific time interval. When a message is received by several users at the same time, it might thus happen that some receivers receive valid and other receivers distorted messages. In such an error condition it must be avoided that some users already process the message, in which case synchronous operation of all bus users is no longer possible.

The users connected to the local area network have to decide whether or not they want to accept a message just transmitted. Considering that the computers are heavily used by real-time tasks, it is absolutely necessary that this decision be made by hardware. So far, known interface modules for microcomputers have made this selection only on the basis of their own user address. In addition to the disadvantages of such an approach as already mentioned above, much computer time is spent on the sorting and storage of the messages according to the contents thereof. The computers are not effectively relieved of this additional load until the interface module is in a position to load the data received directly into the allocated storage cells in dependence on its contents.

To code the data to be transmitted in the motor vehicle, a different number of bits is used depending on the application. Irrespective of the length of the data, it has to be ensured, however, that this data is always consistently processed by the interface module and the connected computer. For example, if the storage of data by its contents is performed in several steps depending on the data length, it has to be ensured that old and new data of the same significance (identification) are not impermissibly mixed if computer access and transmission conflict in time.

It is assumed, for example, that a rotational speed value is transmitted as a two-byte code and loaded into two storage cells by the interface module. In this case, it must not happen that the computer fails to recognize this relationship, reading the first byte of the last and the second byte of the actual transmission and combining them into invalid rotational speed information.

Many transmitting and receiving stations are connected to a local area network. As is known, the probability of network failure increases with the number of such connections. It must be avoided, therefore, that the failure of a single user blocks the entire network.

The dc-coupling of several locally distributed control units often impairs their function due to compensating currents, for example.

The transmission protocol for a local area network in a motor vehicle has to be configured such that dc-decoupling can be accomplished not only where expensive light conductors are used, but also where copper conductors are used.

In motor vehicle applications, the transmission of data involves both fast and slowly changing data. To avoid that the information content of fast changing data is no longer valid when received, the transmission of this type of data has to be given priority. It is therefore necessary to prioritize bus accesses, the processing of transmission requests at the source, and the processing of the data received. The priorities are to be assigned to the messages on an individual basis.

For example, if the request to transmit the engine temperature has already been made, but the actual transmission has not yet been made, it must be ensured that the higher-priority load signal is processed first although the request for its transmission was made later. In known interfaces, the processing sequence can only be determined by the computer under program control. This procedure is not feasible in microcomputers used for real-time tasks in motor vehicles because the demands on computer time would be intolerable due to the high rate of messages to be transmitted.

SUMMARY OF THE INVENTION

The method of the invention is for operating a data processing arrangement for motor vehicles. The data processing arrangement includes at least two computers and a line connecting the computers for transmitting messages. The method according to one embodiment of the invention includes the step of causing the messages to identify themselves with respect to content and significance by means of an identifier.

By contrast with the state of the art described, the method of the invention affords the advantage of permitting a fast and reliable data transmission between the computers installed in the motor vehicle, taking into account the special requirements of a controller coupling in the motor vehicle.

This is accomplished in that the messages to be transmitted identify themselves in terms of content and significance by means of an identifier.

It is a particular advantage herein to assign at the same time a priority to the identifier which is then preferably at the beginning of the message to be transmitted.

In a further advantageous embodiment of the invention, the identifier identifies contents such as addresses, data, sensor signals, correcting quantities, intermediate results, synchronization instructions, instructions to perform a function, rotational speed, rotational speed gradients, engine temperature, engine load, instruction data from an anti-skid or wheel-slip control system, for example, et cetera.

In addition to at least two computers and a line connecting the two computers for transmitting messages, the data processing arrangement can include an error detector with reference to the message. The method according to another embodiment of the invention includes the step of starting the message with a defined bit pattern of at least one bit; including said bit pattern into the CRC-Check; and, following the CRC-Check, a bit pattern follows which is complementary to the starting bit pattern.

By contrast with the state of the art described, the last-mentioned embodiment of the method of the invention affords the advantage of permitting a fast and reliable data transmission between the computers installed in the motor vehicle, taking into account the special requirements of a controller coupling in the motor vehicle.

This is accomplished in that the message to be transmitted begins with a defined bit pattern which is included in an error-detecting function, and that the error-detection check word is followed by a bit pattern complementary to the initial bit pattern.

It is a particular advantage herein to generate the error-detection check word by multiplying a generator polynomial by the residual class polynomial (X+1).

In addition to at least two computers and a line connecting the two computers for transmitting messages, the data processing arrangement can include an error report. The method according to another embodiment of the invention can include the step of transmitting dominant and recessive states onto the line (bus) with the error report including a single status sequence of dominant states.

By contrast with the state of the art described, the last-mentioned embodiment of the method of the invention affords the advantage of permitting a fast and reliable data transmission between the computers installed in the motor vehicle, taking into account the special requirements of a controller coupling in the motor vehicle.

This is accomplished in that dominant and recessive states are transmitted on the line linking at least two computers, and that an error report consists of a single sequence of dominant states not to be confused with the sequence of states occurring when the message is being transmitted.

It is a particular advantage herein that the error report can be issued at any time and by any user coupled to the line. It is a further advantage that the end of the report or the end of the last one of several error reports is used for the synchronization of all users.

According to a further embodiment of the invention, the method includes the step of causing each of the users to receive all messages and having each one of the users further process only those messages which are relevant to it wherein each user administers a list of the messages relevant to it and wherein each user relates parts of the received message to information contained in the list.

By contrast with the state of the art described, the last-mentioned embodiment of the method of the invention affords the advantage of permitting a fast and reliable data transmission between the computers installed in the motor vehicle, taking into account the special requirements of a controller coupling in the motor vehicle.

This is accomplished in that each user receives all messages, but further processes only those relevant to the user. For this purpose, each user has a list of relevant messages to relate these to the messages received.

It is a particular advantage herein that the order of the list determines the further processing priority within the user. Another advantage is that the information contained in the messages is transferable to storage cells in dependence on the list of the particular user and is available to the user for further processing.

According to a still further embodiment of the invention, the method includes the step of causing each user to assign a priority to the messages to be transmitted by means of a list and at every point in time, the list determines the priority of the ready messages for transmission in the user.

By contrast with the state of the art described, the last-mentioned embodiment of the method according to the invention affords the advantage of permitting a fast and reliable data transmission between the computers installed in the motor vehicle, taking into account the special requirements of a controller coupling in the motor vehicle.

This is accomplished in that each user assigns a priority to the messages to be transmitted by means of a list and that at any time this list determines the priority of the messages the user has ready for transmission.

It is particularly advantageous herein that the list includes further information particularly on transmission status and transmission requests. It is a further advantage that transmission errors are detected and recorded and that the transmission is repeated in the event of errors.

In another advantageous improvement, each user is allotted a specified maximum share of the transmission capacity of the line. Another advantageous possibility is to provide for decoupling of a user from the line after this user has issued a specified number of error reports.

According to another embodiment of the invention, the method is for transmitting two-value information (0 and 1) in a motor vehicle. In this embodiment, the method includes the step of transmitting the information (1) deviating from a constant signal level (0) with alternating signal levels (+,−).

By contrast with the state of the art described, the last-mentioned embodiment of the method of the invention affords the advantage of permitting a fast and reliable data transmission between the computers installed in the motor vehicle, taking into account the special requirements of a controller coupling in the motor vehicle.

This is accomplished in that in the method for the transmission of bivalent information as disclosed in the invention, the one information value is transmitted by a constant signal level while the other information value is transmitted by alternating signal levels.

It is particularly advantageous herein to use the alternating signal levels at the same time for error detection.

Further advantages and improvements of the method according to the invention will become apparent from the subsequent description, the drawing and the claims.

DESCRIPTION OF THE DRAWING AND OF THE PREFERRED EMBODIMENTS OF THE INVENTION

To facilitate the description of the drawing and the preferred embodiments of the invention, the following disclosure material is organized under numerically identified paragraphs.

1.0 BRIEF DESCRIPTION OF THE DRAWING

FIG. 6 is a schematic of light conductors on a bus line;

FIG. 7 shows the format of a message;

FIG. 18 is a diagram of a stuff error in the DATA-FIELD;

FIG. 19 is a diagram showing a bit error in ACK SLOT;

2.0 PHYSICAL IMPLEMENTATION

Table 1 shows the possible bus topologies, coupling and line types in dependence on the transmission medium selected.

TABLE 1

| Transmission Medium | Bus Topology | Coupling | Line Type |
|---|---|---|---|
| Electrical Conductor | Linear Pus Star | Direct inductive Optical Coupler | Conductor pair Twisted Pair Coaxial Cable |
| Light Conductors | Linear Bus Star with Central Coupler | Electro-optical Transducers | Glass Fibers Synthetic Fibers |
| Transmission Method: | | Time Division Multiplex Baseband Transmission | |
| Access Method: | | Multimaster Deterministic Bus Assignment | |
| Spatial Expansion: | | Depends on Transmission Rate | |

The bus system presented above can be precisely implemented if the transmission medium allows two states having the properties dominant and recessive. Examples for the Above are:

| | Shunt Impedance | Energy | AND Gate |
|---|---|---|---|
| Dominant | Low ohmage | Available | 0 |
| Recessive | High ohmage | Not Available | 1 |

Figure 1:
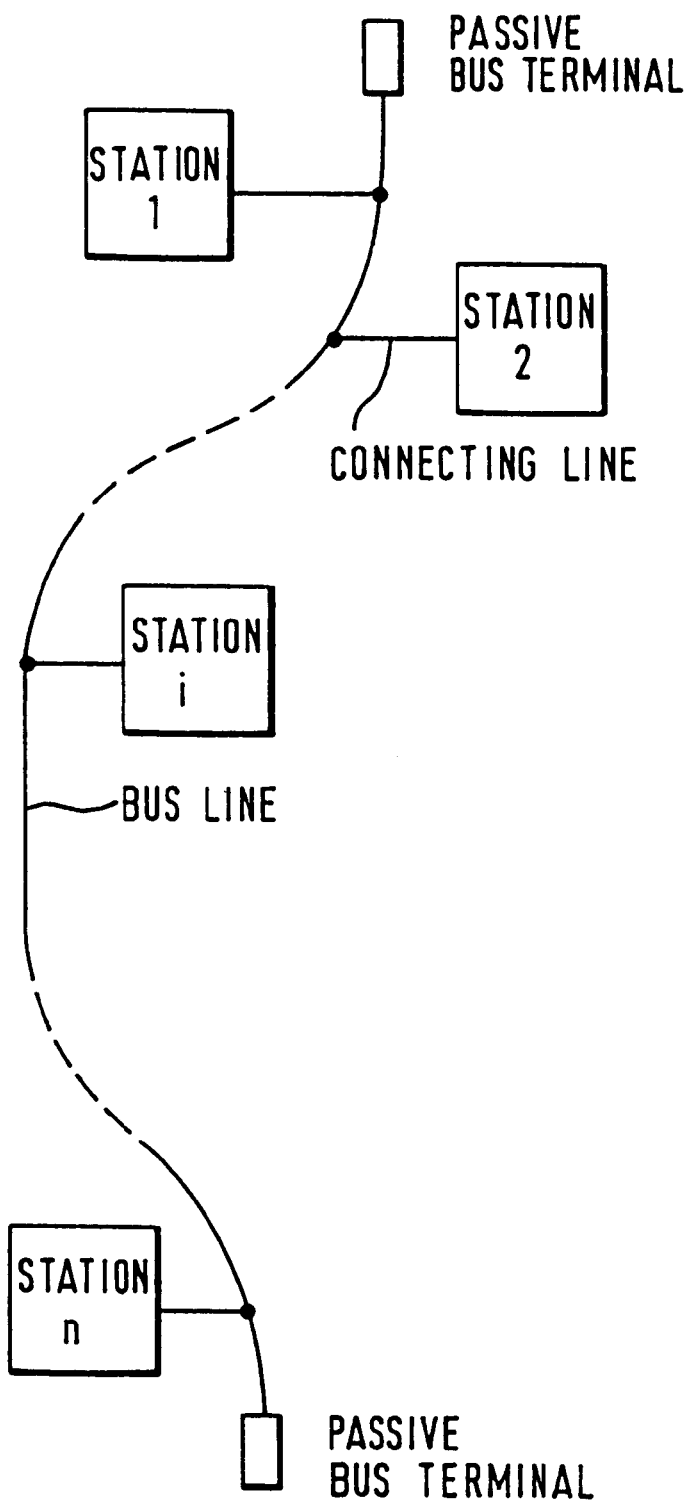
FIG. 1 is a schematic of an embodiment of a linear bus structure.

Examples for Impedance
  Switch Closed/Open
  Transistor Conducts/is Cut Off
Examples for Energy
  Voltage is Applied/Not Applied
  Light is On/Off FIG. 1 shows an embodiment of a linear bus system. It includes a continuous bus line (pair of wires or light guides) and lines connecting with the individual user stations.

Figure 2:
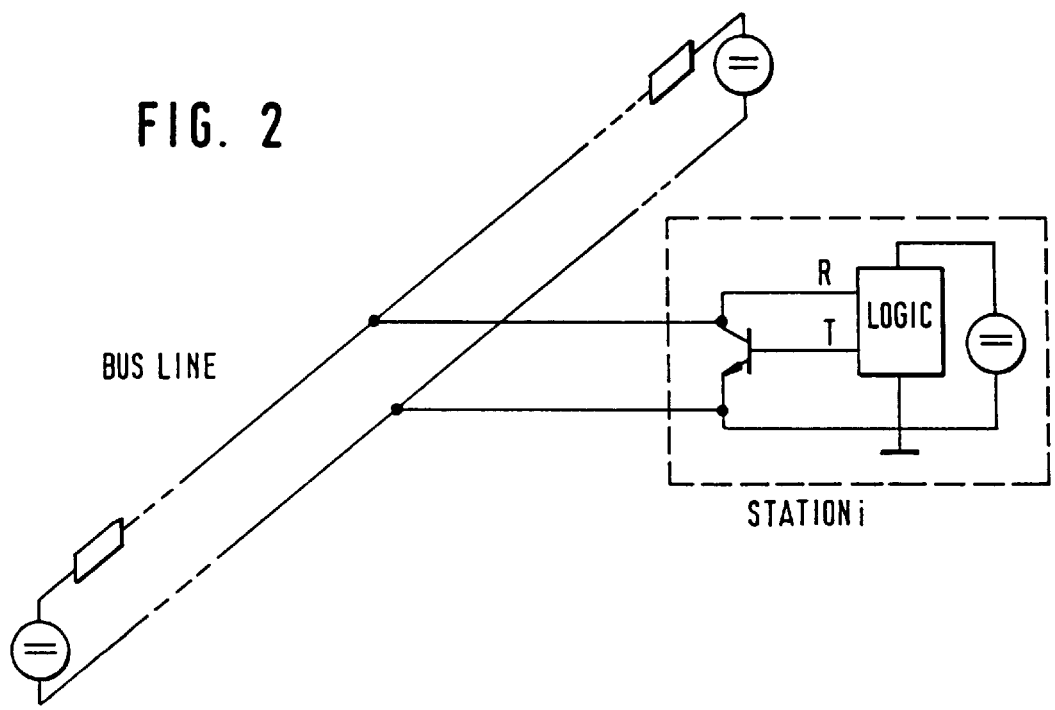
FIG. 2 is a schematic of a directly coupled asymmetrical drive of the bus line.

FIG. 2 shows an embodiment with direct coupling to the bus line. The drivers are transistors operating as controllable switching devices (open-collector coupling). The bus line is a two-wire line or a coaxial cable. It is driven asymmetrically. A supply voltage is applied to the end of the bus line via resistors. The bus is considered to be in its dominant state if at least one driver transistor conducts.

Figure 3:
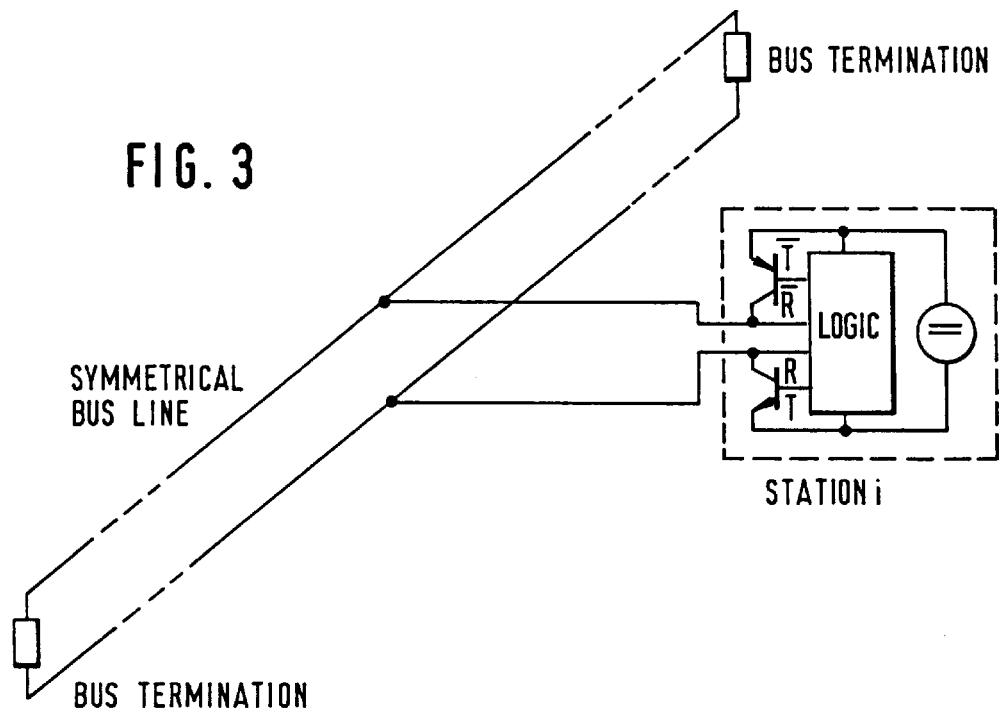
FIG. 3 is a schematic of a directly coupled symmetrical drive of the bus line.

FIG. 3 shows an embodiment using two complementary driver transistors as transmitting drivers which are controlled to conduct or to cut off simultaneously. As a result, the line is driven symmetrically. The advantage of this arrangement is an increased immunity from, and a reduced spread of, interferences.

In the examples referred to above, the bus line is directly coupled to the individual stations. This may cause problems in an environment which is subject to electric or electro-magnetic interferences, if the individual stations are coupled via further lines (power supplies, for example). The following examples do not have this disadvantage.

Figure 4:
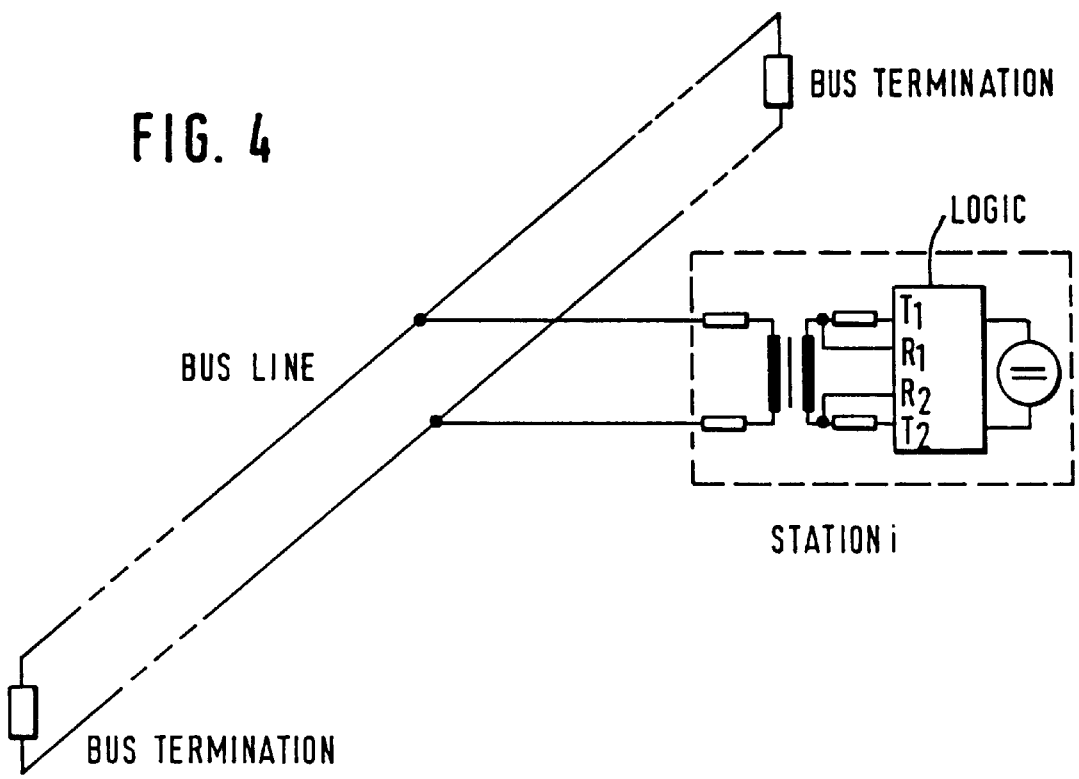
FIG. 4 is a schematic of a decoupled symmetrical drive using transformers.

FIG. 4 shows an embodiment using transformers for dc decoupling. The absence of direct current is obtained by biphase coding. The bus status becomes recessive by decoupling all transformers from their drivers (drivers switched to high resistance). The bus status becomes dominant if a positive or negative going pulse is applied to at least one of the transformers. The pulse polarity is synchronized by defining the polarity of the start bit.

Another embodiment of a dc-decoupled coupling arrangement is possible through the use of optical couplers. A particularly simple embodiment is the use of optical couplers with open-collector outputs.

Figure 5:
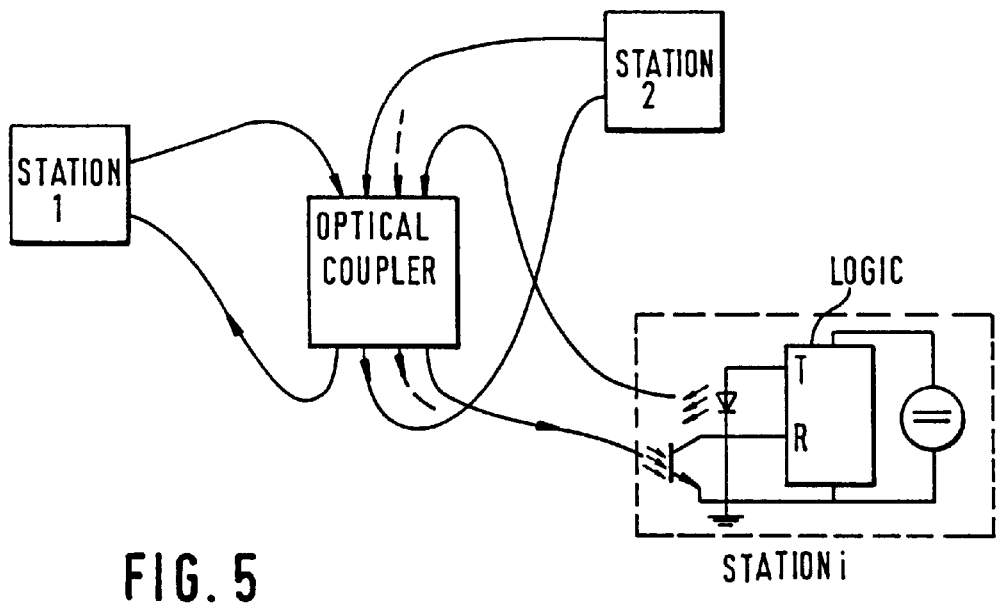
FIG. 5 is a schematic of light conductors in a star network.

FIG. 5 shows, by way of example, an embodiment of light conductors used in a star network including a central optical coupler. The coupling can be passive or be provided by means of electro-optical transducers. Dominant bus status: at least one transmitter diode lights up. Recessive bus status: all transmitter diodes dark.

FIG. 6 shows, by way of example, an embodiment of light guides used in a linear bus system. The branch lines are connected to the central bus line in a manner dispensing with the need for sophisticated passive or electro-optical transducers for coupling and decoupling the light. An example is to connect the central bus line and the branch line by fusing them together. Dominant bus status: at least one transmitter diode lights up. Recessive bus status: all transmitter diodes dark.

3.0 TRANSMISSION PROTOCOL

A message is comprised of the bit fields START-OF-FRAME, IDENTIFIER, CONTROL-FIELD, DATA-FIELD, CRC-FIELD, ACK-FIELD, END-OF-FRAME and INTERMISSION (see FIG. 7). In this description, the terms HIGH and LOW are used in the sense of logic levels. While HIGH has a recessive effect on the bus, LOW is dominant. As a result, all bus users receive a LOW level provided that at least one of several bus users sends a LOW. A description of each of the bit fields is presented below.

(a) START-OF-FRAME

This field defines the start of a message. It consists of a single LOW bit.

A bus user may begin the transmission of a message only if the bus is free, that is, in the BUS-IDLE status (see section 5.0). All receivers are synchronized on the leading edge caused by START-OF-FRAME.

(b) IDENTIFIER

This field identifies the contents of the DATA-FIELD by holding a name and a priority.

The IDENTIFIER has not necessarily the significance of an address which identifies a single receiver from a plurality of bus users. Whether or not a correctly received message is further processed by the bus users is exclusively determined by the ACCEPTANCE-FILTER (see section 7.1.1.3) of each bus user. Seen from the transmitter, there is thus no difference between a point-to-point transmission and the simultaneous addressing of some or all of the bus users.

If multiple transmitters try to gain access to the bus at the same instant, the bus arbitration process decides on the basis of the priorities which transmitter will be authorized to further transmit the message (see section 4.0).

In the present embodiment, the IDENTIFIER field is eight bits long. (IFL=IDENTIFIER-FIELD-LENGTH=8)

(c) CONTROL-FIELD

This field comprises the bit fields REMOTE-TRANSMISSION-REQUEST, DATA-BYTE-CODE and bits reserved for future expansions.

Figure 8:
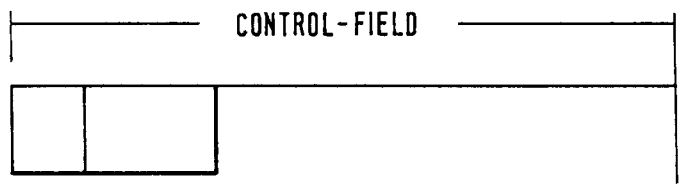
FIG. 8 shows the CONTROL-FIELD format.
Figure 8:
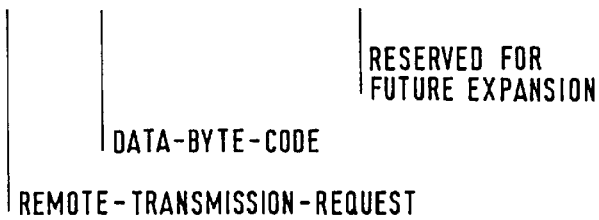

(d) REMOTE-TRANSMISSION-REQUEST indicates whether the message is to transmit or request data. DATA-BYTE-CODE contains information on the length of the data field (see FIG. 8).

In the present embodiment, the CONTROL-FIELD is eight bits long. (CFL=CONTROL-FIELD-LENGTH=8)

(e) DATA-FIELD

This field contains the information to be transmitted the significance of which is determined by the IDENTIFIER field. The field length (DATA-BYTE-COUNT) is variable and can be two, four or eight bytes long.

DATA-BYTE-COUNT=2 ** DATA-BYTE-CODE

DFL=DATA-FIELD-LENGTH=8 * DATA-BYTE-COUNT (f) CRC-FIELD

Figure 9:
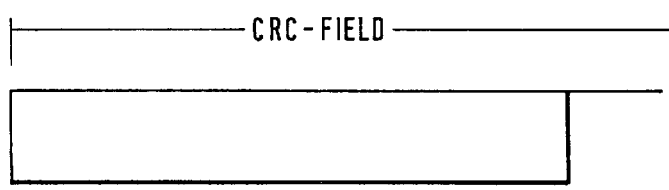
FIG. 9 shows the CRC-FIELD format.
Figure 9:
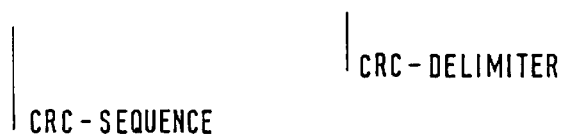

This bit field contains the check word (CRC-SEQUENCE) produced by means of a generator polynomial. Its end is indicated by a CRC-DELIMITER (FIG. 9).

The generator polynomial is selected for short message lengths (less than 120 bits to be protected). This provides a greater Hamming distance than for the protection of long messages having the same number of check bits.

In the present embodiment, CRC-SEQUENCE is 15 bits long. Stated otherwise: (CRCL=CRC-SEQUENCE-LENGTH=15).

The check word protects the fields of START-OF-FRAME, IDENTIFIER, CONTROL-FIELD, DATA-FIELD and CRC-SEQUENCE (excluding CRC-DELIMITER).

(g) CRC-DELIMITER

The CRC-DELIMITER is a single HIGH bit. It follows the CRC check word, closing the CRC-FIELD.

Cyclic codes are not in a position to detect errors attributable to a cyclic shift of the entire code word (bits to be protected and protection bits). A cyclic shift results again in a valid code word.

If, however, the START-OF-FRAME bit which is at LOW by definition is included in the code word, each rotation of the code word can be recognized by the CRC-FIELD being not closed with a HIGH level.

(h) ACK-FIELD

All receiving stations indicate to the transmitting station that a correct message has been received by transmitting a LOW bit as the first bit in this field. It is followed by a second bit which is at HIGH (ACK-DELIMITER). This lets the transmitter know whether at least one of the bus users has properly received the message.

Bus users which have received a message containing errors signal this condition by means of an ERROR-FLAG.

If the transmitter fails to receive an acknowledgment from at least one destination, it will issue an error report itself.

(i) END-OF-FRAME

This field is comprised of an uninterrupted sequence oiE HIGH bits signalling the end of a message.

The length of the END-OF-FRAME field has to be selected such that all receivers which, due to a faulty transmission of the length information, expect data in this field, are in a position to detect a level error already on the next-to-last bit of END-OF-FRAME (see CODING). Independent of preceding transmission errors, each bus user can thus recognize the end of a message.

If the transmitter senses at least one LOW bit (for example, the ERROR-FLAG bit) on the bus during END-OF-FRAME, the transmitter last active will interpret this as a response to the message it has just transmitted. This identifies error reports uniquely, even if the error condition is not detected by one of the receivers until the next-to-last bit of a message has been transmitted.

In the present embodiment, END-OF-FRAME is seven bits long and represented as: (EOFL=END-OF-FRAME-LENGTH=7).

(j) INTERMISSION

This field is comprised of a continuous sequence of HIGH bits. While this field is at HIGH, none of the bus users is allowed to start the transmission of a new message.

During INTERMISSION, each receiver has the possibility to signal an overload (not ready to receive) by sending an ERROR-FLAG. This delays the transmission of the next message until all receivers are again ready to receive.

An error report occurring during INTERMISSION is dealt with in the same manner as error reports occurring during other bit fields. However, the preceding message will not be repeated by the transmitter concerned.

In the present embodiment, INTERMISSION is three bits long and represented as: (IML=INTERMISSION-LENGTH=3).

(k) BUS-IDLE

The bus is free if it continues to be at HIGH after INTERMISSION has elapsed. The duration of BUS-IDLE is arbitrary. If a LOW bit is received, this will be interpreted as START-OF-FRAME.

Figure 10:
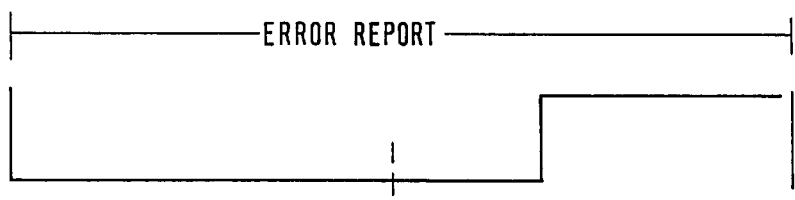
FIG. 10 shows the error report format.
Figure 10:
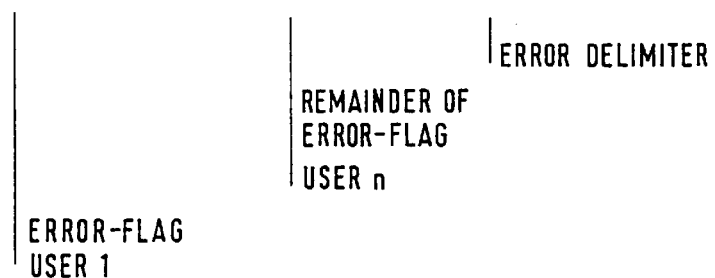

An error report is comprised of the bit fields ERROR-FLAG and ERROR-DELIMITER (see FIG. 10).

(1) ERROR-FLAG

This field is a continuous sequence of LOW bits.

The length of the sequence has to be determined such that it is a violation of the "bit stuffing" rule applied to all the bit fields from START-OF-FRAME to CRC-DELIMITER. The other bus users respond by transmitting an error report themselves.

In the present embodiment, the ERROR-FLAG is six bits long and is represented by: (EFL=ERROR-FLAG-LENGTH=6) (m) ERROR-DELIMITER Each error report is closed by a continuous sequence of HIGH bits.

The transmission of the ERROR-DELIMITER begins after all other users have completed the transmission of the ERROR-FLAG (transition from LOW to HIGH on the bus).

In the present embodiment, the ERROR-DELIMITER field is seven bits long: (EDL=ERROR-DELIMITER-LENGTH=7).

4.0 BUS ORGANIZATION

Traffic on the bus is based upon the following five rules:

(1) BUS ACCESS

The bus users may start the transmission of a message only with the bus in the BUS-IDLE status.

All receivers have to be synchronized to the leading edge of START-OF-FRAME.

(2) BUS ARBITRATION

If two or more bus users attempt to send a message at the same time, this conflict is solved by an arbitrating mechanism on bit level.

During this arbitration, each transmitting station compares the bit level it transmits to the bus with the bit level it actually senses on the bus. If the bit levels are not identical, the transmitter concerned has to stop sending without transmitting one further bit. This rule makes it possible for the arbitration process to be performed without destroying information on the bus. That sender whose message includes the IDENTIFIER with the highest priority gains the bus access and completes the transmission of the message it has already started.

(3) CODING

The message segments START-OF-FIELD, IDENTIFIER, CONTROL-FIELD, DATA-FIELD and CRC-FIELD are coded according to the bit stuffing method. If five identical bits occur in the bit stream to be transmitted in continuous sequence, the transmitter will automatically insert a bit of inverse order into the bit stream.

(4) DECODING

The message segments START-OF-FIELD, IDENTIFIER, CONTROL-FIELD, DATA-FIELD and CRC-FIELD are decoded according to the bit stuffing method. If the bus user receives five identical bit levels in an uninterrupted sequence, it will remove the subsequent stuff bit from the bit stream. The stuff bit must be of inverse order relative to the preceding bits (error check).

(5) ERROR MESSAGE

Each bus user establishing a transmission error notifies all other users by sending them six consecutive LOW bits (ERROR-FLAG).

An error is reported immediately on its detection, that is, starting with the bit following the error status. Only if a CRC-ERROR is detected is the error report sent off three clock pulses later. This makes sure that the ACK-FIELD is not overwritten by an error report released by a CRC-ERROR.

The error report is terminated by a change from LOW to HIGH after at least six LOW bits on the bus (see status diagram for error handling).

(6) OVERLOAD

If an overload condition occurs (the message received has not been processed yet), each bus user has the possibility to so inform all other bus users by sending them an ERROR-FLAG during INTERMISSION (see INTERMISSION).

5.0 STATUS DIAGRAMS 5.1 Explanatory Remarks Pertaining to the Status Diagrams Each rectangular frame represents a system status. The transitions between the states which depend on input and status variables are shown by connecting lines with arrows. The transitions occur invariably with the active edge of the bus clock pulse. The same clock pulse edge is also used to apply output data to the bus line. The actual bus level is not read until briefly before the next active edge of the bus clock pulse.

After a BUS-IDLE condition, the bus clock pulse is synchronized to the next transition of the bus level from HIGH to LOW.

The input and status variables may be ordered and combined to form a decision vector.

The decision vector has the following format: (BUS-MONITOR, BUS-DRIVE, STUFF, COUNT, TX-REQUEST, CRC-ERROR, OVERLOAD)

A description of the above elements follows:

(1) BUS MONITOR

Input variable reflecting the logic level read on the bus line.

| | | |
|---|---|---|
| BUS-MONITOR = 0 | bus level dominant | (LOW) |
| BUS-MONITOR = 1 | bus level recessive | (HIGH) |

(2) BUS-DRIVE

Status variable indicating the logic level transmitted in this status.

| | | |
|---|---|---|
| BUS-DRIVE = 0 | transmit level dominant | (LOW) |
| BUS-DRIVE = 1 | transmit level recessive | (HIGH) |

(3) STUFF

Input variable indicating whether the bus level was constant during the last five clock pulses (five LOWs or five HIGHs). The logic level indicated by BUS-MONITOR is the most recent one of this chain of five.

| | |
|---|---|
| STUFF = 0 | bus level has changed |
| STUFF = 1 | bus level was constant |

(4) COUNT

Status variable indicating whether the internal counter (CNTR) has run down. This counter is not required in all states. If required, the counter is set on transition to the respective status.

| | |
|---|---|
| COUNT = 0 | counter not run down yet (CNTR <> 0) |
| COUNT = 1 | counter run down (CNTR = 0) |

(5) TX-REQUEST

Input variable indicating whether a message is ready to be sent so that the users have to participate in the next bus assignment procedure.

| | |
|---|---|
| TX-REQUEST = 0 | transmission order not available |
| TX-REQUEST = 1 | transmission order available |

(6) CRC-ERROR

Status variable indicating whether the message received contained a transmission error. This variable is set after the last bit of the CRC-SEQUENCE has been received.

| | |
|---|---|
| CRC-ERROR = 0 | reception was correct |
| CRC-ERROR = 1 | transmission error |

(7) OVERLOAD

Status variable indicating whether processing of the message last received could be completed by the interface logic or whether an overload condition exists.

| | |
|---|---|
| OVERLOAD = 0 | receiver logic overloaded |
| OVERLOAD = 1 | receiver logic ready |

The decision vector determines clearly which status comes next. Therefore, the status diagram can be described by means of the decision vectors. The character "x" in a vector element indicates that the variable concerned is not relevant for the decision (the variable may be 0 or 1).

5.2 Example for the BUS-IDLE Status

Figure 12:
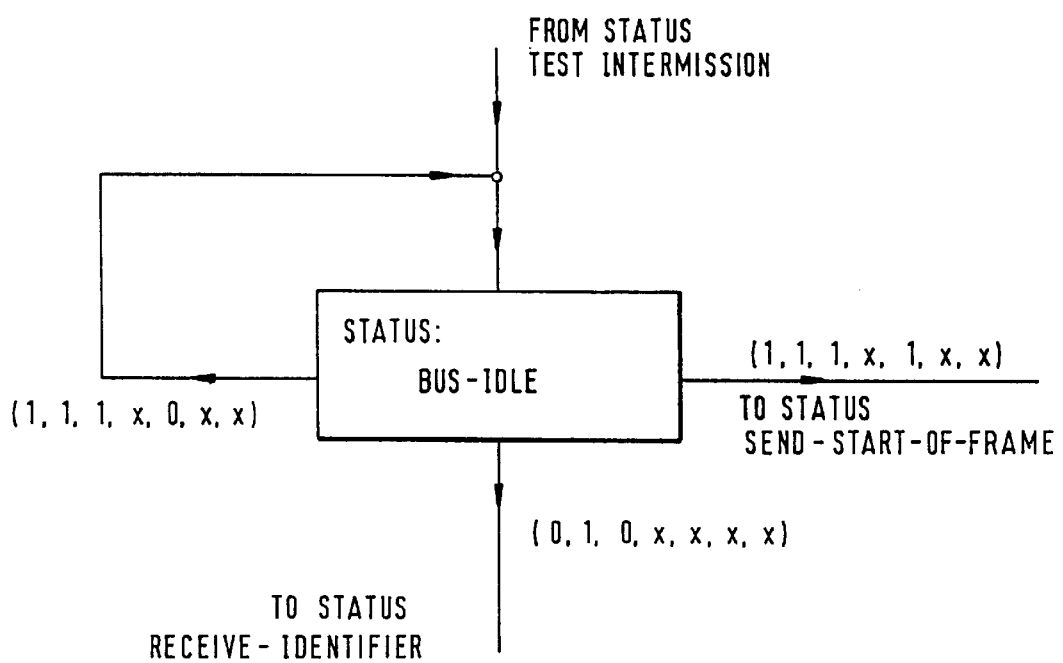
FIG. 12 shows the bus-idle status format.

As a rule, the BUS-IDLE status (FIG. 12) follows the TEST-INTERMISSION status. During BUS-IDLE, the recessive transmit level HIGH is always applied to the bus line.

Transitions to follow-on status:

(1) Decision Vector (1,1,1x,0,x,x):

This decision vector signifies the following:

Bus level HIGH, transmit level HIGH, bus has been HIGH for at least five consecutive clock pulses, counter irrelevant, no transmit request, transmission error and overload irrelevant. Since a bus action was not detected and a transmit request was not available, the next status is again BUS-IDLE.

(2) Decision Vector (1,1,1,x,1,x,x):

While having variables substantially identical to those under (1), this vector includes a transmit request. Since the bus line is free, the station can begin transmitting immediately. The next status is thus TRANSMIT-START-OF-FRAME.

(3) Decision Vector (0,1,0,x,x,x,x):

A LOW level has been detected on the bus line, that is, at least one other bus user has started transmitting a message. The LOW bit detected is START-OF-FRAME. The follow-on status is RECEIVE-IDENTIFIER.

(4) All further decision vectors indicate a hardware error or hardware fault within the interface module.

The same applies to all other system states described in the status diagrams RECEIVE-MODE, TRANSMIT-MODE and ERROR-HANDLING.

Apart from the decision vectors resulting from faults on the bus line, only those vectors will be mentioned which may occur with the hardware in operative condition. The remaining vectors can be used to simplify the control unit or they can be dealt with in a HARDWVARE-ERROR status to increase system security.

5.3 Status Diagram RECEIVE-MODE

Figure 13A:
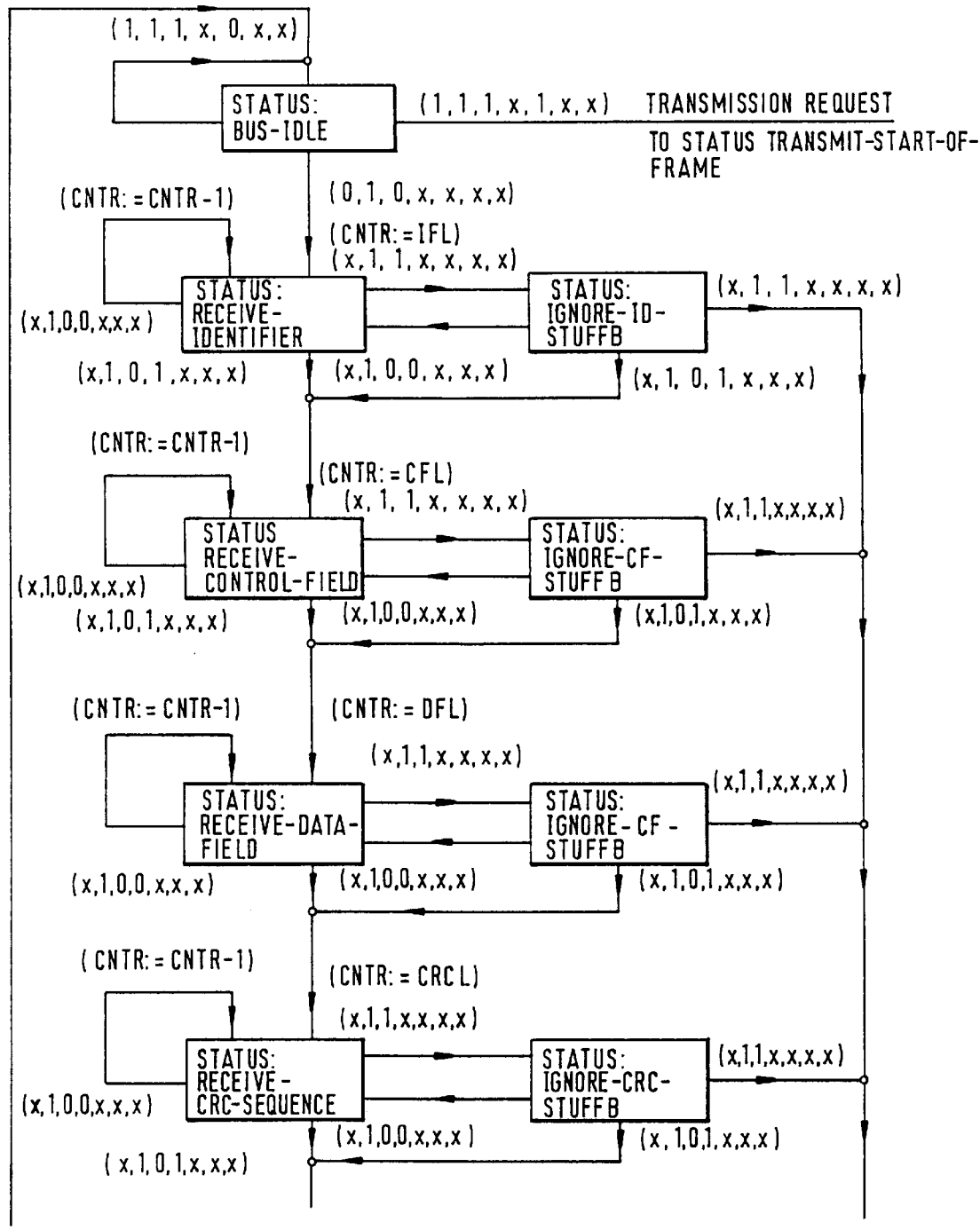
FIGS. 13a and 13b show a single diagram of the receive-mode status.
Figure 13B:
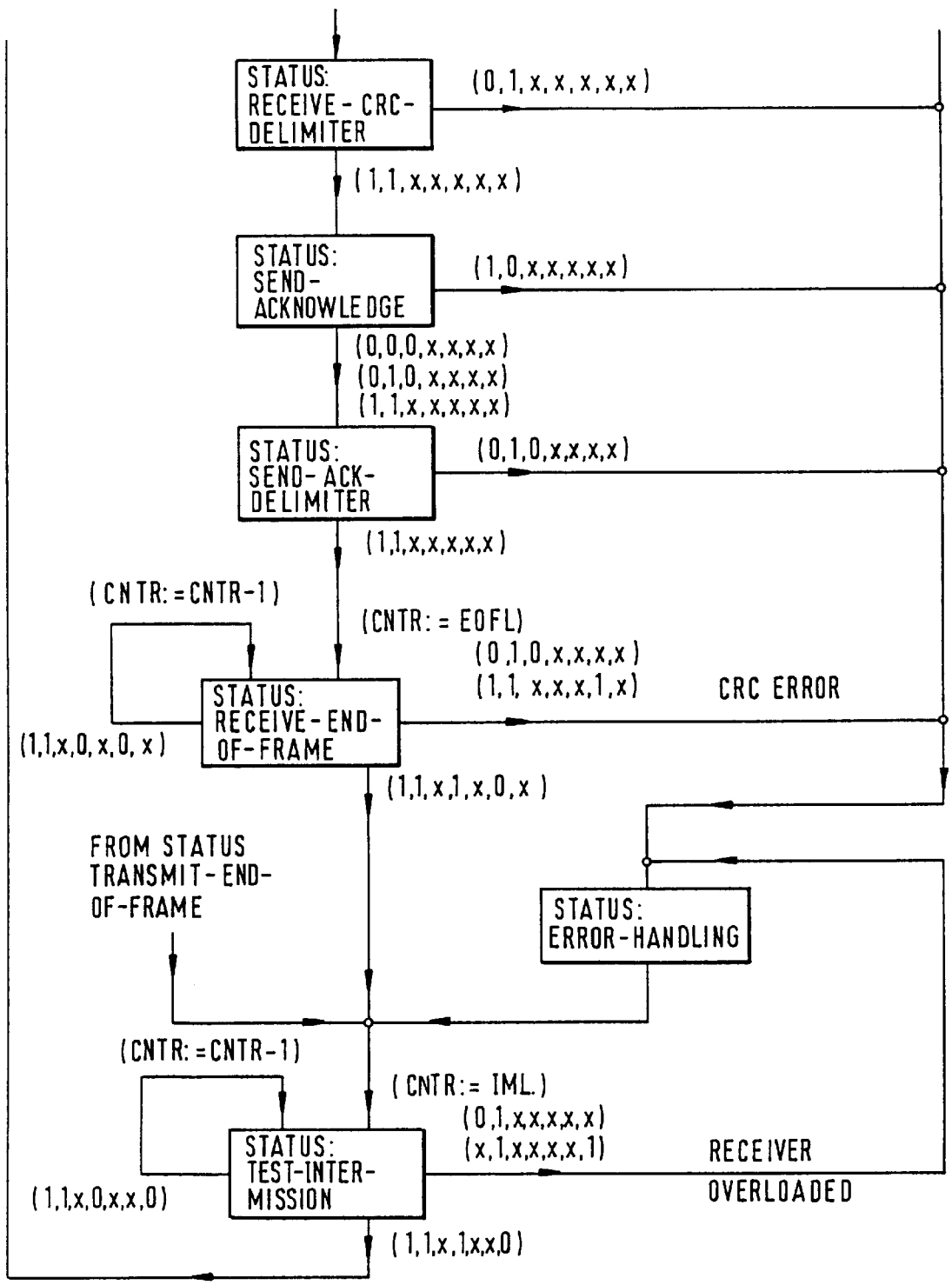

The BUS-IDLE status is left on detection of (FIGS. 13a and 13b) START-OF-FRAME on the bus, followed by RECEIVE-IDENTIFIER. During status transition, the counter CNTR is set to IFL=8 (IDENTIFIER-FIELD-LENGTH). IFL indicates the number of identifier bits specified (see section 3.0, IDENTIFIER).

With each identifier bit received, the loop of the RECEIVE-IDENTIFIER status is executed once, whereby the counter is decremented. If a stuff bit occurs in the IDENTIFIER, STUFF=1 will cause a transition to the IGNORE-ID-STUFFB status which ignores the stuff bit. If the condition STUFF=1 continues to be present, this indicates an abnormal situation (bus line fault, error report from another user, unexpected bus idle condition); in response to this condition, the ERROR-HANDLING status comes next. However, if STUFF=0, the system will return to the RECEIVE-IDENTIFIER status.

After counter runout, the system goes to the RECEIVE-CONTROL-FIELD status (from either RECEIVE-IDENTIFIER or IGNORE-ID-STUFFB). In this status, the counter is set to CFL=8 (CONTROL-FIELD-LENGTH).

When all bits of the CONTROL-FIELD are received, the data field is received next in the RECEIVE-DATA-FIELD status. It is to be noted in this connection that the counter is not set to a constant but to a variable DFL (DATA-FIELD-LENGTH) which may assume the values 8, 16, 32 or 64.

The next status is RECEIVE-CRC-SEQUENCE in which the CRC check word (CRC-SEQUENCE) is received. For this purpose, counter CNTR is first set to CRCL=15 (CRC-SEQUENCE-LENGTH). After the last CRC bit is received, the status variable CRC-ERROR will be set. (CRC-ERROR=0 indicates no error, CRC-ERROR=1 indicates an error in the transmission frame.)

The CRC check word always requires a bit with the level HIGH (CRC-DELIMITER) at its end. This is checked in the RECEIVE-CRC-DELIMITER status. If the bus level is false, the system jumps to the ERROR-HANDLING status.

In the next bus clock cycle, the receiving stations have to acknowledge that the message has been received. This is done in the SEND-ACKNOWLEDGE status by the receivers sending a LOW level for correct receipt or a HIGH level to indicate an error condition. On detection of a HIGH level on the bus, the system goes to the ERROR-HANDLING status, provided that the dominant LOW level was sent.

The first acknowledge bit is followed by ACK-DELIMITER which has to be at HIGH at all times. This level is issued by all receivers in the SEND-ACK-DELIMITER status. On receipt of a LOW level, the system will go over to the ERROR-HANDLING status.

When the status switches to RECEIVE-END-OF-FRAME, counter CNTR is initialized with EOFL=7 (END-OF-FRAME-LENGTH). If CRC-ERROR=1 or if a LOW bus level is received during RECEIVE-END-OF-FRAME, the system will go over to the ERROR-HANDLING status.

If no error condition was encountered, the message is considered received completely. The status TEST-INTERMISSION follows which is comprised of IML=3 cycles (INTERMISSION-LENGTH). The bus level has to be HIGH all the time, or else the system will jump to ERROR-HANDLING. In the TEST-INTERMISSION status, each receiver has the possibility to signal an overload (OVERLOAD=1) which will delay the sending of the next message until the receiver is again ready to receive. This is also dealt with by ERROR-HANDLING. After counter CNTR rundown, the BUS-IDLE status will be selected next, which starts a new receive or transmit cycle.

With regard to the stuff bits which may occur in the fields: CONTROL-FIELD, DATA-FIELD and CRC-SEQUENCE, the explanations given in connection with the RECEIVE-IDENTIFIER status apply analogously.

5.4 Status Diagram TRANSMIT-MODE

Figure 14A:
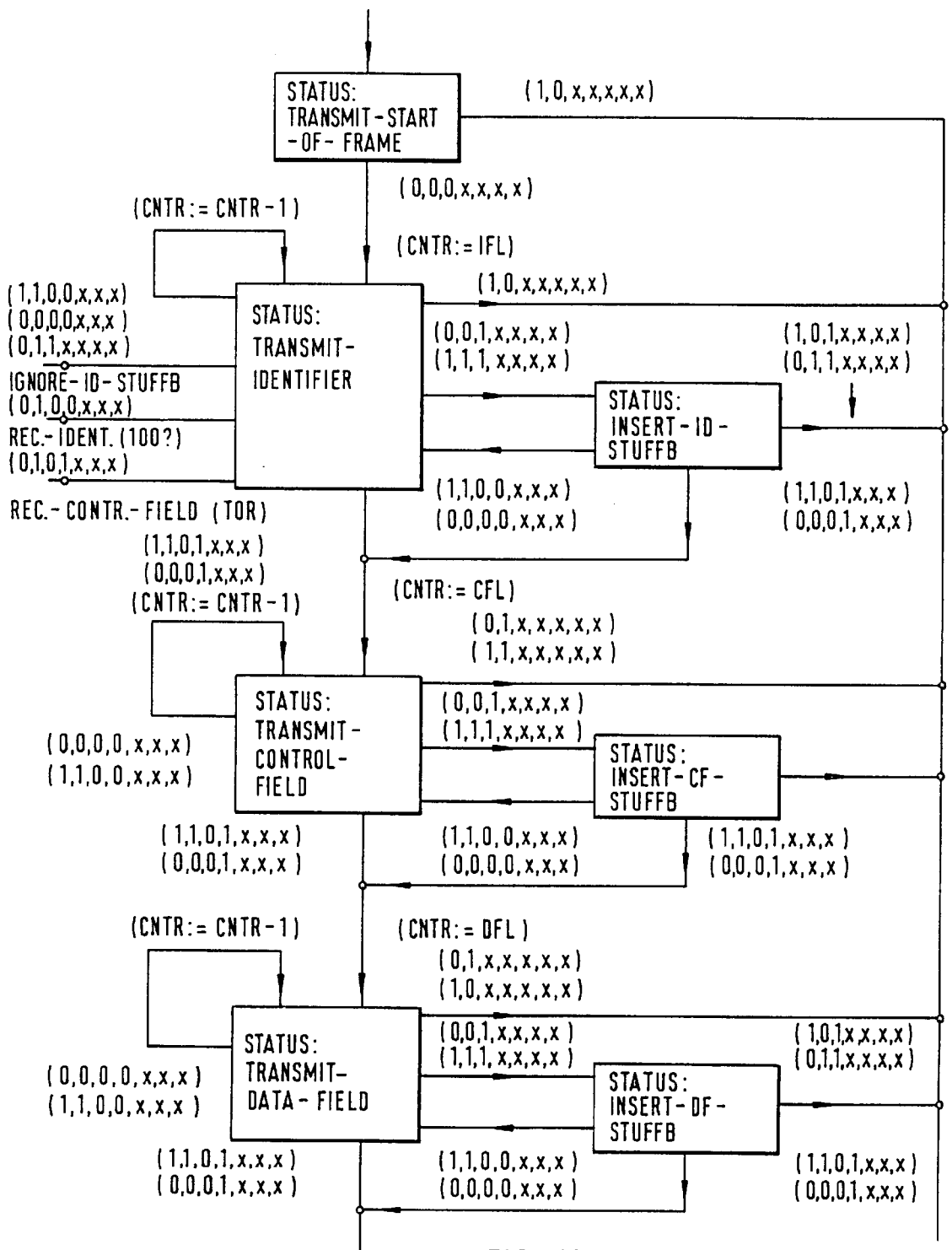
FIGS. 14a and 14b show a single diagram of the transmit-mode status.
Figure 14B:
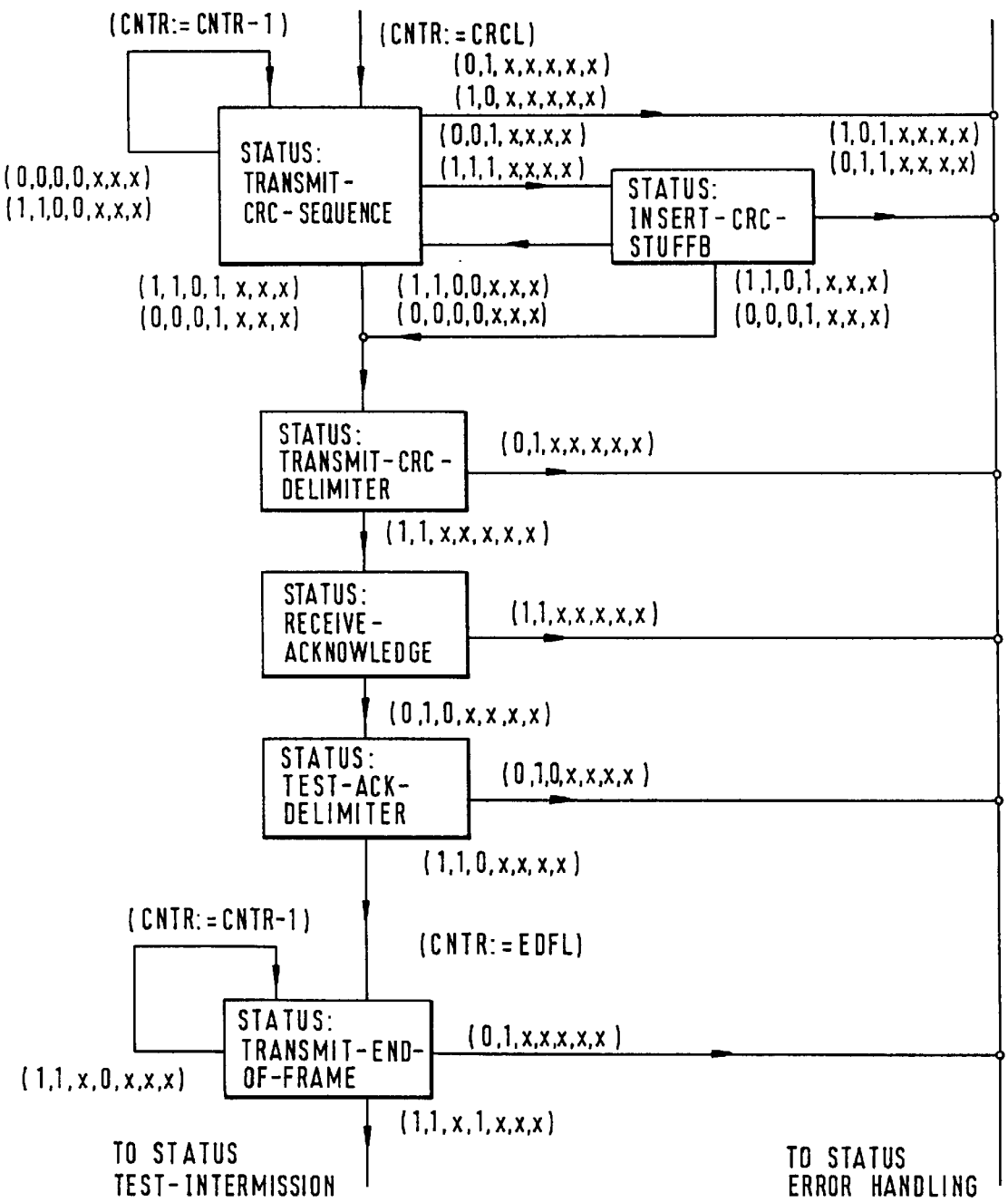

The transfer from the BUS-IDLE status to the transmit (FIGS. 14a and 14b) mode occurs if a transmission request (TX-REQUEST=1) arrives prior to or during BUS-IDLE (see RECEIVE-MODE status diagram).

The transmission of a message starts with the TRANSMIT-START-OF-FRAME status in which the dominant transmit level LOW is issued. If a disturbance distorts the dominant level LOW to become HIGH, the system will jump to the ERROR-HANDLING status.

Otherwise, the bus assignment procedure will follow in the TRANSMIT-IDENTIFIER status. The counter is initially set: to IFL=8 (IDENTIFIER-FIELD-LENGTH).

The TRANSMIT-IDENTIFIER status will remain (only the counter will be decremented) if the level received corresponds to the level transmitted and the last five bus levels were not constant and the counter has not yet run down.

The movement out of the TRANSMIT-IDENTIFIER status will occur if:

(a) the recessive HIGH level transmitted was overwritten by a LOW. The bus assignment is thus lost.

If STUFF=1, the next status will be IGNORE-ID-STUFFB. Otherwise, with the counter not run down, the follow-on status will be RECEIVE-IDENTIFIER; if the counter has run down, the follow-on status will be RECEIVE-CONTROL-FIELD.

(b) a dominant LOW level transmitted is distorted to become a HIGH. In this case, the follow-on status will be ERROR-HANDLING.

(c) the level received does correspond to the level transmitted. If the last five levels were identical, the system must go to the INSERT-ID-STUFFB status. If not and with the counter run down, the follow-on status will be TRANSMIT-CONTROL-FIELD. In the latter case, control of the bus was gained.

In the INSERT-ID-STUFFB status, the stuff bits of the IDENTIFIER-FIELD are inserted. Since control of the bus cannot get lost in this status, the follow-on status will be ERROR-HANDLING if the transmit and receive levels are different. Otherwise, the system will return to the TRANSMIT-IDENTIFIER status if the counter has not run down yet. If the counter has run down, control of the bus will be gained, and the follow-on status will be TRANSMIT-CONTROL-FIELD.

At the start of the TRANSMIT-CONTROL-FIELD status, counter CNTR is initialized with CFL=8 (CONTROL-FIELD-LENGTH). With the bus assignment completed, the transmit and receive levels have to be identical from that moment on. If this is not the case, the system will branch to the ERROR-HANDLING status. With the counter not run down and an edge change occurring within the last five clock cycles, the system will remain in the TRANSMIT-CONTROL-FIELD status, only the counter will be decremented. Stuff bits are inserted in the INSERT-CF-STUFFB status. If the counter has run down, the system will go to the TRANSMIT-DATA-FIELD status.

The processes occurring during TRANSMIT-CONTROL-FIELD apply also to the TRANSMIT-DATA-FIELD and TRANSMIT-CRC-SEQUENCE states. At the start of the TRANSMIT-DATA-FIELD status, counter CNTR will be set to the variable DFL (DATA-FIELD-LENGTH) which may assume the values 8, 16, 32 or 64. At the start of the TRANSMIT-CRC-SEQUENCE status, the counter will be set to the constant CRCL=15 (CRC-FIELD-LENGTH).

Subsequent to CRC-SEQUENCE, the CRC-DELIMITER has to be transmitted. This is accomplished in the TRANSMIT-CRC-DELIMITER status. If the HIGH level sent is distorted to become a LOW level, the system will go over to the ERROR-HANDLING status.

The next step involves testing of the acknowledge bit. A HIGH level received indicates that none of the users has received the message correctly or that all users have a false frame synchronization. Therefore, the transmitting station issues an error report in the ERROR-HANDLING status. If a LOW level is received, the follow-on status is RECEIVE-ACK-DELIMITER. ACK-DELIMITER must always be at HIGH. If this is not true, the system will go to ERROR-HANDLING.

The end of the message is transmitted in the TRANSMIT-END-OF-FRAME status. Since END-OF-FRAME consists of seven HIGH bits, the counter CNTR is set to EOFL=7 (END-OF-FRAME-LENGTH). If a HIGH level is received, the system remains in the TRANSMIT-END-OF-FRAME status until the counter has run down; then it branches to TEST-INTERMISSION. By contrast, if a low level is received, it will go to ERROR-HANDLING.

Transfer to the TEST-INTERMISSION status terminates the TRANSMIT-MODE. The TEST-INTERMISSION status is identical to that described above with reference to the RECEIVE-MODE.

5.5 Status Diagram ERROR-HANDLING

Figure 15:
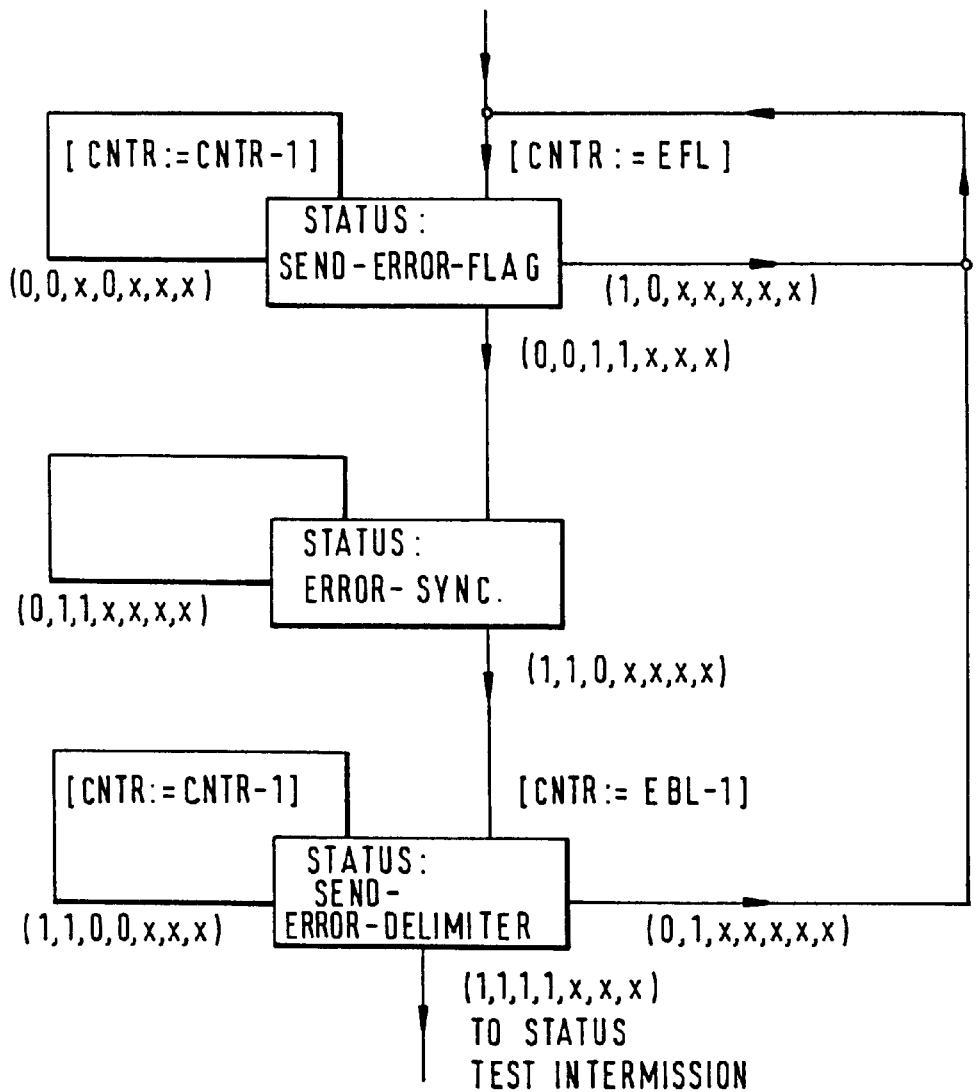
FIG. 15 is a diagram showing the error-handling status.

Error handling starts with the SEND-ERROR-FLAG status. (FIG. 15) The ERROR-FLAG serves to notify all users that a transmission error has occurred on the bus or that a receiver is overloaded. The ERROR-FLAG consists of six consecutive LOW bits; therefore, the counter CNTR is set to EFL=6 (ERROR-FLAG-LENGTH) with the start of the SEND-ERROR-FLAG status. If a fault distorts the dominant LOW levels transmitted to HIGH, the system will start once more with ERROR-HANDLING. Otherwise, the counter is decremented. With the counter at zero, the system will go to the ERROR-SYNC status.

In the ERROR-SYNC status, there is a pause until other users which might also be sending an ERROR-FLAG are finished. This condition is indicated by the bus level going to HIGH.

Error handling is completed by ERROR-DELIMITER being sent into the SEND-ERROR-DELIMITER status. At the start of this status, counter CNTR will be set to EDL-1=6 (ERROR-DELIMITER-LENGTH=7). ERROR-DELIMITER consists of seven HIGH bits of which the first one was already sent in the ERROR-SYNC status. If a LOW level is detected on the bus when the remaining bits are sent, the system will begin again with ERROR-HANDLING. Otherwise, it will continue to TEST-INTERMISSION after the counter has run down. This terminates the error handling procedure.

6.0 ERROR HANDLING 6.1 Error Response

Immediately upon the detection of an error, that is, beginning with the bit following the error status, each user sends an error report (ERROR-FLAG). Only if a CRC error is sensed will the error report be sent off three clock pulses later. This prevents the ACK-FIELD from being overwritten by an error report caused by a CRC error. Keeping the ACK-FIELD free enables a transmitter to receive both an acknowledgment from some receivers and an error report from the remaining receivers. Repeated occurrences of such conditions make it possible to determine with a high degree of probability whether the problem lies with the transmitter itself or one of the receivers.

An error report consists of at least six consecutive LOW bits (ERROR-FLAG). After subsequent transfer from LOW to HIGH, a pause for at least ten HIGH bits is required (ERROR-DELIMITER and INTERMISSION).

6.2 Error Occurrence

The way errors are handled depends on their occurrence in terms of both location and time.

Section 6.5 gives a few examples of error responses of the open-collector bus.

The following Table 6.2 provides an overview of all possible single-bit error conditions.

The references to individual sections as made in the following table relate to the examples of error responses delineated in Section 6.5.

TABLE 6.2

| Occurrence Time Location | At the Transmitter and all Receivers | At the Transmitter and some of the Receivers | At the Transmitter and none of the Receivers | Not at Transmitter but all Receivers | Not at Transmitter but some of the Receivers |
|---|---|---|---|---|---|
| BUS-IDLE START-OF-FRAME | | | 6.5.4 | | 6.5.7 |
| IDENTI-FIER | 6.5.1 | | | | |
| CONTROL-FIELD (DATA-BYTE-COUNT) | | | | 6.5.6 | |
| DATA-FIELD | | 6.5.2 | 6.5.5 | | 6.5.8 |
| CRC-FIELD | | | | | |
| CPC-DE-LIMITER | | | | | |
| ACK-SLOT | | 6.5.3 | | | |
| END-OF-BLOCK | | | | | |
| INTER-MISSION | | | | | |

6.3 Error Classes

On the basis of the bus protocol described in Section 3.0 and the bus organization specified in Section 4.0, the following types of error may occur:

| | | |
|---|---|---|
| Transmitter: | BF | Bit error, bus level does not correspond to transmitted level. |
| | BK | In the TRANSMIT-IDENTIFIER status (arbitration) and the TRANSMIT-START-OF-FRAME status, only a HIGH bus level with a transmitted LOW bit is considered an error. |
| | AF | No acknowledgment during RECEIVE-ACKNOWLEDGE. |
| | NF | LOW bit detected on the bus during TEST-INTERMISSION status. |
| | SF | Violation of stuffing rule. |
| Receiver: | CF | CRC-error. |
| | DF | CRC-SEQUENCE is not closed by a CRC-DELIMITER, that is, no HIGH bit follows the CRC check word. |
| | NF | LOW bit detected on the bus during RECEIVE-END-OF-FRAME status and TEST-INTERMISSION status. |
| | SF | Violation of stuffing rule. |
| | BF | Bit error in TRANSMIT-ACK status. |

The next Table 6.3 shows all possibilities for error detection resulting from the combination of error occurrences in terms of time and location as well as the error classes. The table shows the error classes detectable at the time the error occurs.

The abbreviations in the upper line and lower line of each field of the matrix characterize the error classes occurring at the transmitter and the receiver, respectively.

TABLE 6.3

| Occurrence Time Location | At the Transmitter and all Receivers | At the Transmitter and some of the Receivers | At the Transmitter and none of the Receivers | Not at Transmitter but all Receivers | Not at Transmitter but some of the Receivers |
|---|---|---|---|---|---|
| BUS-IDLE START-OF-FRAME | BK | BK | BK | | |
| IDENTI-FIER | BK,SF SF | BK,SF SF | BK,SF | SF | SF |
| CONTROL-FIELD (DATA-BYTE-COUNT) | BF,SF SF | BF,SF SF | BF,SF | SF | SF |
| DATA-FIELD | BF,SF SF | BF,SF SF | BF,SF | SF | SF |
| CRC-SE-QUENCE CRC-DE-LIMITER | BF,SF CF,DF,SF | BF,SF CF,DF,SF | BF,SF | CF,CD,SF | CF,CD,SF |
| ACK-SLOT | AF,SF BF,SF | AF,SF BF,SF | AF,SF | BF,SF | BF,SF |
| END-OF-BLOCK | BF,NF NF | BF,NF NF | BF,NF | NF | NF |
| INTER-MISSION | BF,NF NF | BF,NF NF | BF,NF | NF | NF |

6.4 Explanatory Remarks

The following symbols are used in the embodiments below:

| | |
|---|---|
| a | Disturbance |
| --- | Message undisturbed |
| *** | Own Intervention |
| ### | External Intervention |
| S | Stuff bit |
| 1 to 8 | Numbering |
| R | BUS-IDLE status detected |
| B | Bit error detected during a transmission |
| F | Error detected by a user |
| Z | Start of an error report |
| K | User has lost arbitration and stops transmitting |

Model parameters of the following examples of error handling:

Maximum number of bits of identical level (S=5)
END-OF-FRAME consists of six consecutive HIGH bits (EOFL=6)
INTERMISSION consists of three consecutive HIGH bits (IML=3)

An error report consists of at least six consecutive LOW bits (EOFL=6)

A transmitter is understood to be station in the process of sending or with a transmission request set.

6.5 Examples of Single Bit Errors 6.5.1 Global error, detectable by all users. Bit error in IDENTIFIER.

Figure 16:
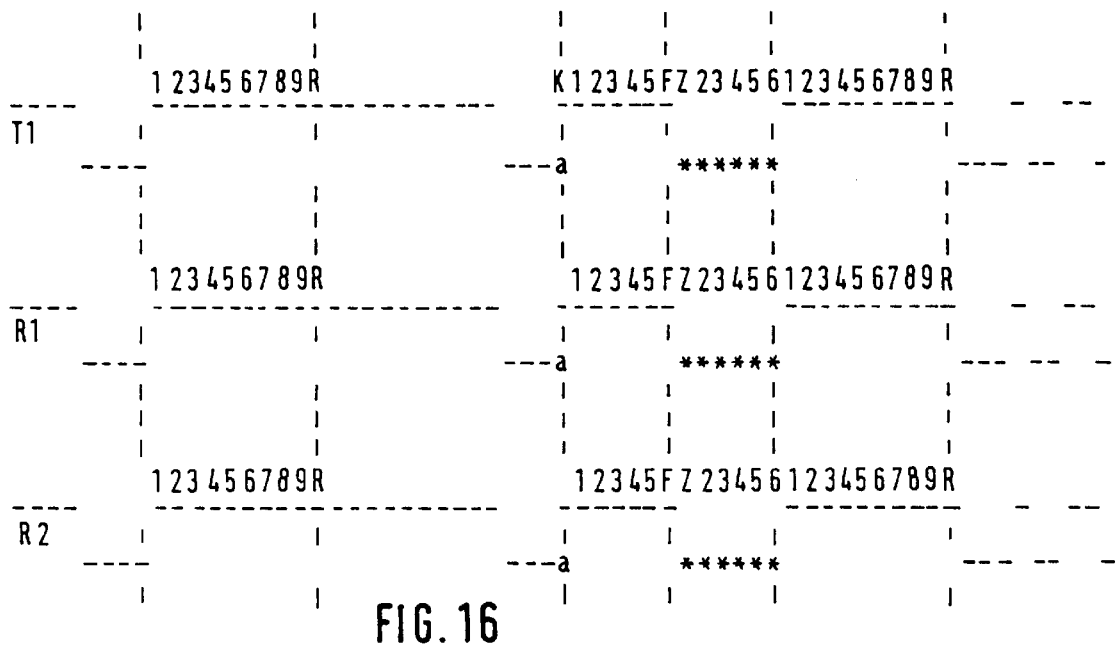
FIG. 16 is a diagram showing a single bit error.

The transmitter "loses" the arbitration, subsequently detecting a stuff error as do the receivers as shown in FIG. 16. Following the error report and a subsequent BUS-IDLE status, it is possible to start the transmission of new messages or to repeat the disturbed message. Two transmitting stations start transmitting at the same time.

Figure 17:
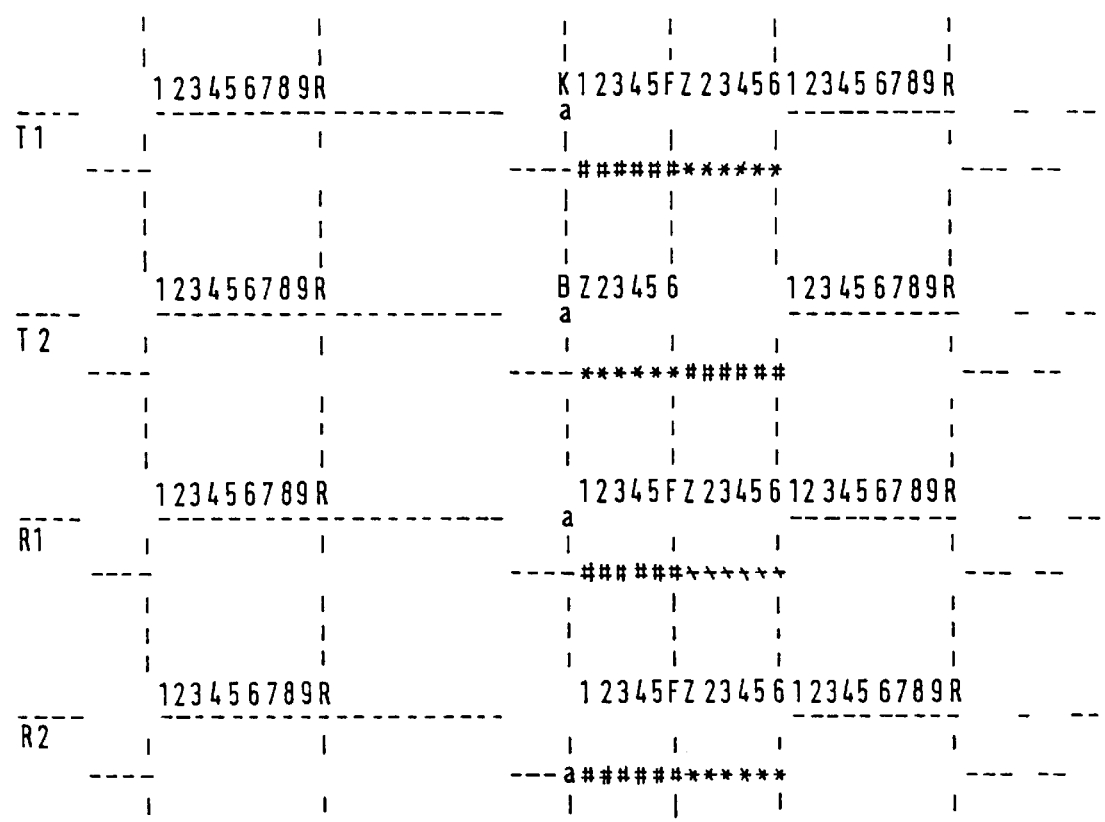
FIG. 17 is a diagram showing another single bit error.

This condition produces a bit error at transmitter T2 which issues an error report as shown in FIG. 17. The result is a stuff error at the receiver and a bit and/or stuff error at transmitter T1. After the last LOW bit of the error report, followed by a BUS-IDLE status, it is possible to start the transmission of new messages or to repeat the garbled message.

Figures 18, 19:
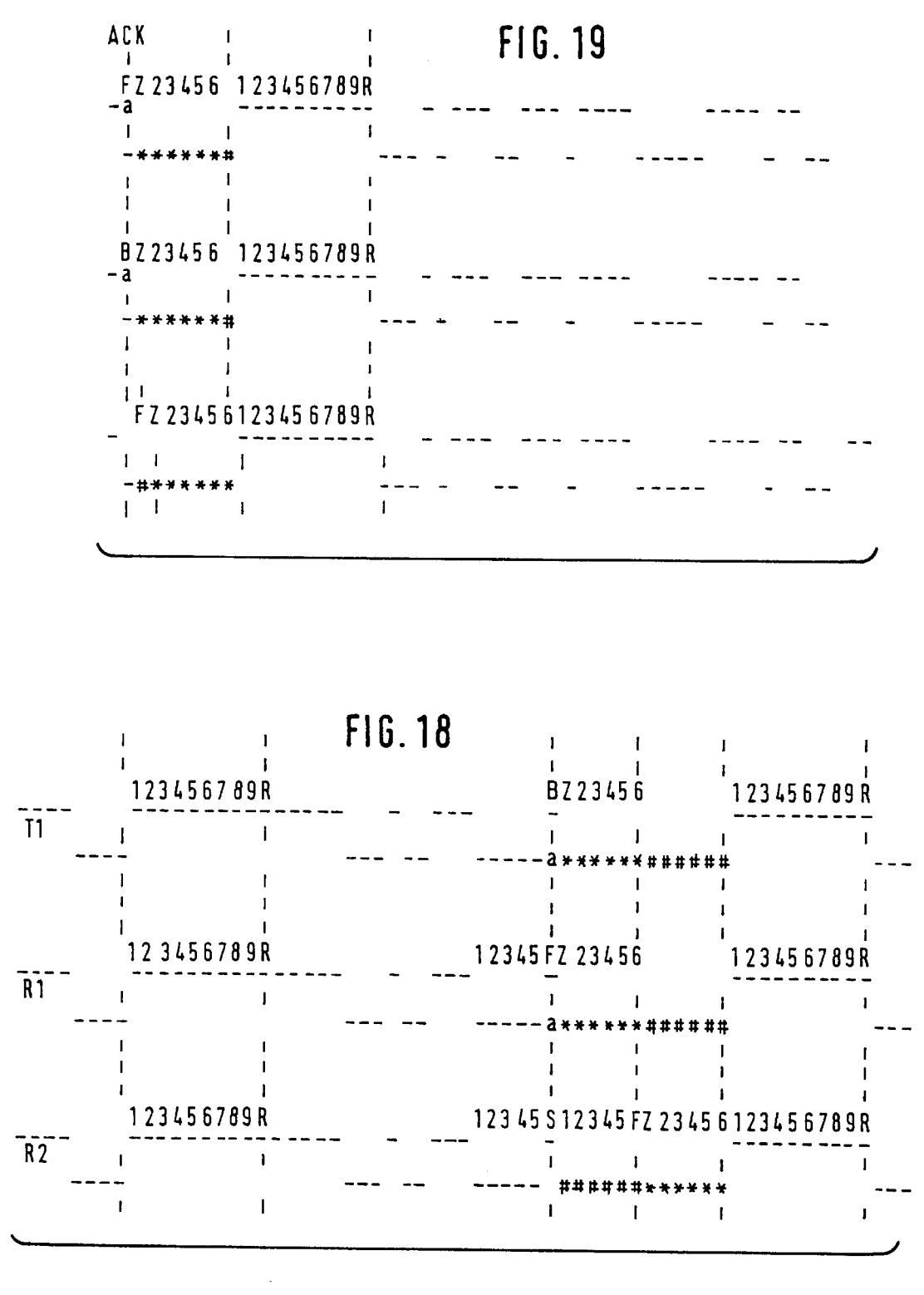

6.5.2 Error condition occurring at some of the receivers and at the transmitter or a station with a transmission request set. Stuff error in the DATA-FIELD (FIG. 18).

The transmitter detects a bit error, and the faulty receivers detect a stuff error and issue an error report. This produces a stuff error at the non-faulty receiver which will then also issue an error report. After the last LOW bit of the error report and a follow-on BUS-IDLE status, it is possible to start with new transmissions or to repeat the garbled message.

6.5.3 Error condition occurring at some of the receivers and at the transmitters or a station with transmission request set. Bit error in ACK-SLOT (FIG. 19).

The faulty receivers detect a bit error (their LOW bit becomes garbled) and issue an error report. The transmitter fails to receive an acknowledgment and likewise sends an error report. The non-faulty receivers thereby recognize an error condition (ACK-DELIMITER) and they issue an error report. After the last LOW bit of the error report, it is possible to start with new transmissions or to repeat the garbled message.

Figure 20:
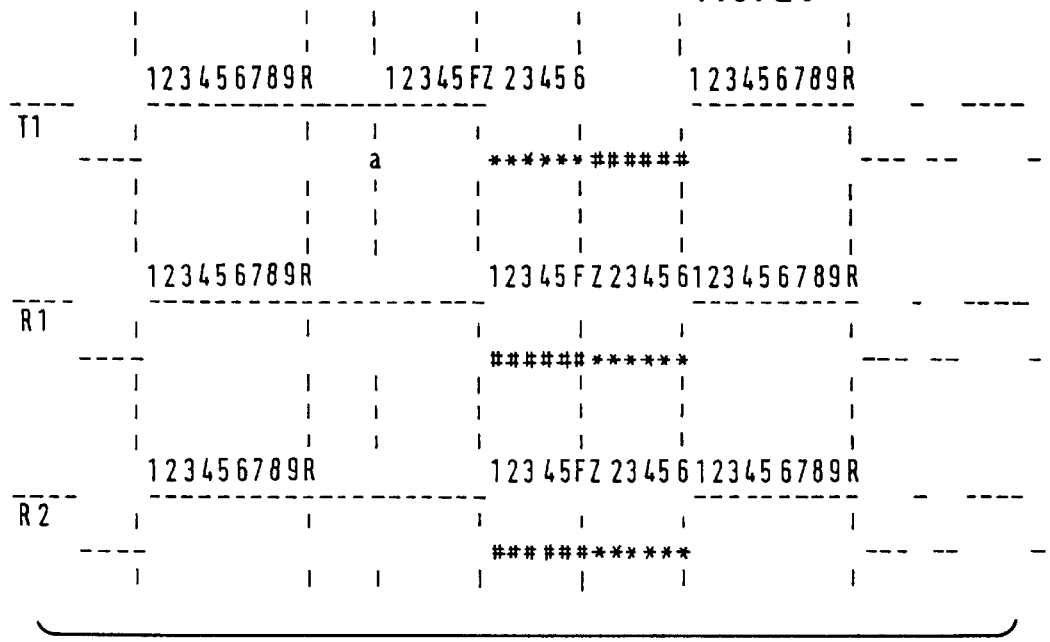
FIG. 20 is a diagram showing an error in BUS-IDLE.

6.5.4 Fault condition only at the transmitter. Error in BUS-IDLE (FIG. 20).

As a result of the fault, transmitter T1 is no longer in a position to start transmitting, and it will react like a receiver until the end of the error-handling procedure. T1 senses a stuff error and issues its error report. Receivers R1 and R2 thereby also receive a stuff error and issue an error report. After termination of the error report and a subsequent BUS-IDLE status, new transmissions may be started.

Figure 21:
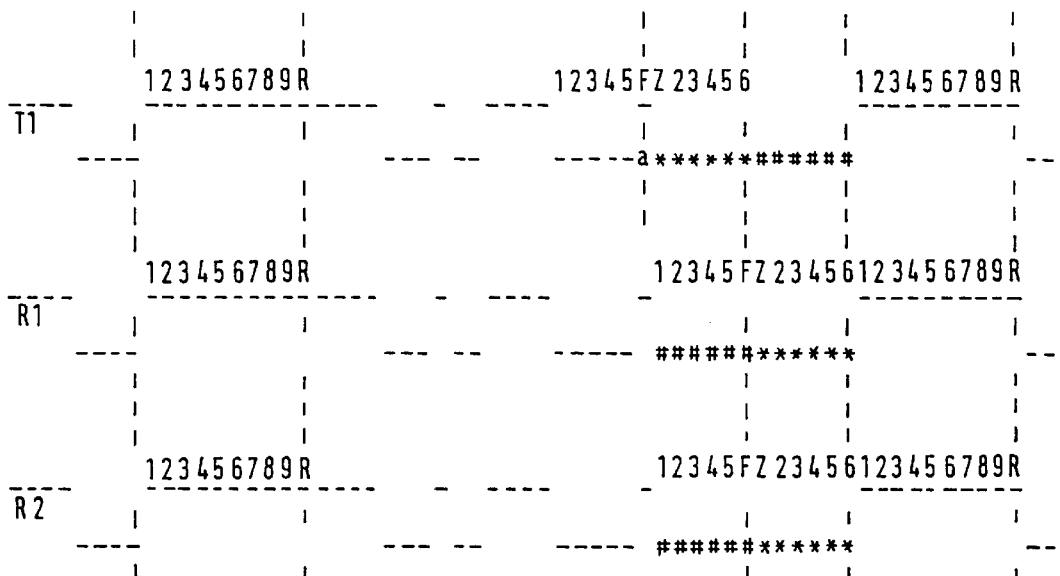
FIG. 21 is a diagram showing a stuff error in the DATA-FIELD.

6.5.5 Disturbance condition occurring only at transmitter. Stuff error in the DATA-FIELD (FIG. 21).

The transmitter senses a stuff error and a bit error at the same time and issues an error report. This produces a stuff error at the receivers which will likewise issue an error report. After the last LOW bit of the error report and a follow-on BUS-IDLE status, it is possible to start with new transmissions or to repeat the garbled message.

6.5.6 Error condition occurring at all receivers but not at the transmitter or a station with a transmission request set. Bit error in the CONTROL-FIELD, length information falsified.

Figure 22:
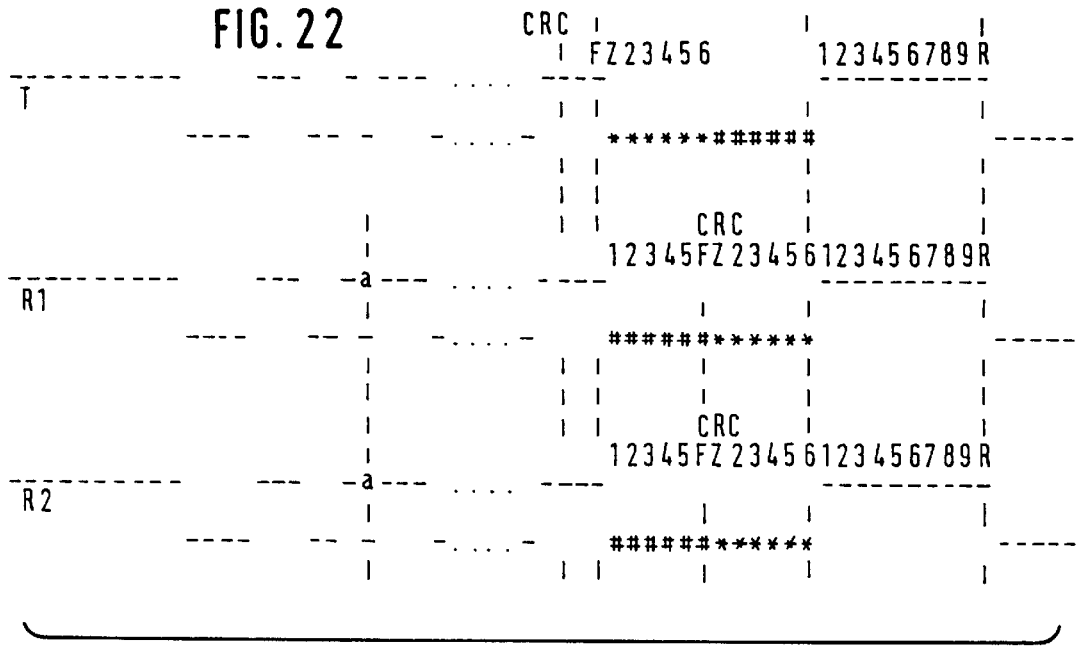
FIG. 22 is a diagram showing an error condition wherein receivers expect a longer message than is actually sent.

Case 1: Longer length specified. Receivers expect longer message than is actually sent (FIG. 22).

The receivers can no longer acknowledge the receipt of a message at the right place; therefore, the transmitter senses an error issuing an error report. This produces a stuff error at the receivers and the latter will then also send off an error report. After the last LOW bit of the error report and a follow-on BUS-IDLE status, it is possible to start with new transmissions or to repeat the garbled message.

Figure 23:
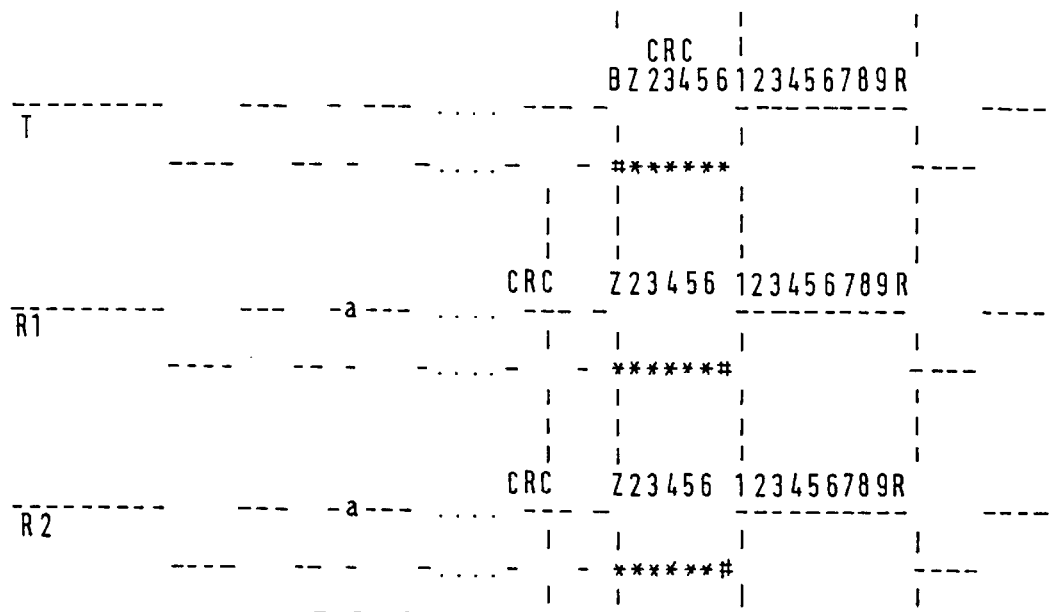
FIG. 23 is a diagram showing an error condition wherein receivers expect a shorter message than is actually sent.

Case 2: Reduction of the length specified. Receivers expect shorter message than is actually sent (FIG. 23).

Determining a CRC error, the receivers issue an error report. This produces a bit error at the transmitter which then also issues an error report. After the last LOW bit of the error report and a follow-on BUS-IDLE status, it is possible to start new transmissions or to repeat the garbled message.

Figure 24:
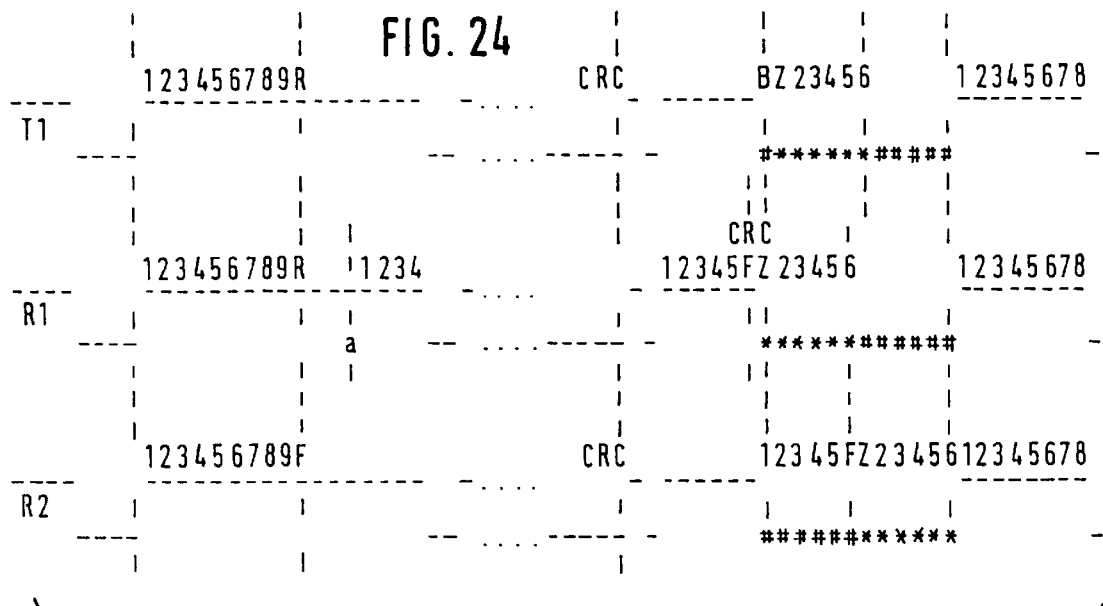
FIG. 24 is a diagram showing an error condition occurring at some receivers, but not at the transmitter or a station with a transmission request set.

6.5.7 Error condition occurring at some of the receivers, but not at the transmitter or a station with a transmission request set. Bit error in BUS-IDLE (FIG. 24).

Because of the error, the faulty receivers receive an incorrect length specification as a result of which they put their CRC check in the wrong place. If the faulty receivers execute their CRC check by more than eight clock pulses delayed, the receivers detect a stuff error and issue an error report. If the CRC is executed within eight cycles after it is expected, the faulty receivers detect a CRC error and issue an error report. This causes a bit error at the transmitter. The non-faulty receivers receive an inadmissible bit sequence as END-OF-FRAME and likewise send an error report. After the last LOW bit of the error report and a follow-on BUS-IDLE status, new transmissions can begin or the garbled message can be repeated.

Figure 25:
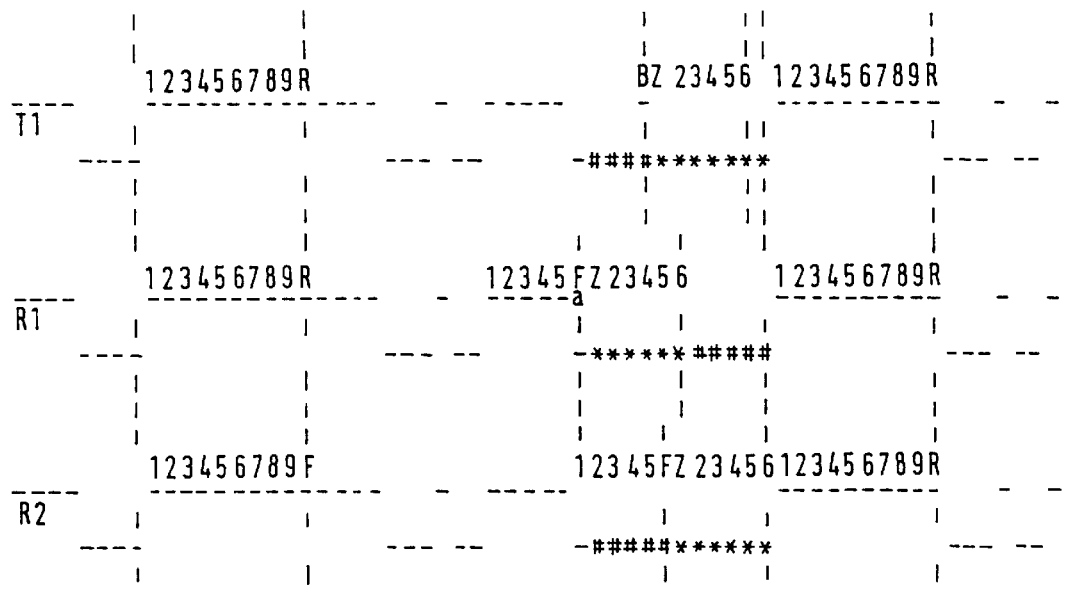
FIG. 25 is a diagram showing an error condition occurring at some of the receivers but not at the transmitters or a station with a transmission request set.
Figure 26:
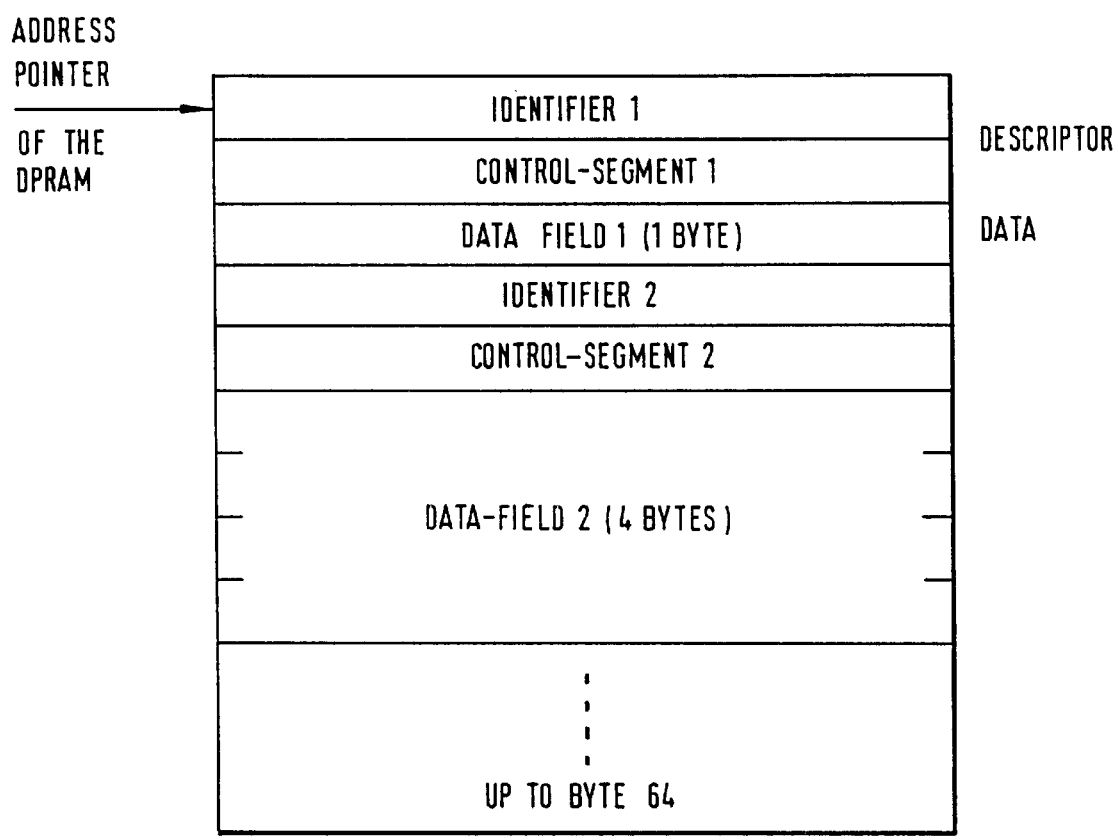
FIG. 26 is a diagram showing a DPRAM for storing messages.

6.5.8 Error condition occurring at some of the receivers but not at the transmitters or a station with a transmission request set. Stuff error in the DATA-FIELD (FIG. 25).

The faulty receivers detect a stuff error and issue an error report. As a result, a bit error occurs at the transmitter and a stuff error at the non-faulty receivers which will then also issue an error report. After the last LOW bit of the error report and a follow-on BUS-IDLE status, it is possible to start with new transmissions or to repeat the garbled message.

7.0 INTERFACE MANAGEMENT PROCESSOR (IMP)

7.1 Configuration 7.1.1 General Concept 7.1.1.1 Structure

The functions of the IMP Interface Management Processor are:

Data exchange between CPU and serial interface using a Dual-Port RAM (DPRAM);

Control of transmit and receive functions.

Figure 11:
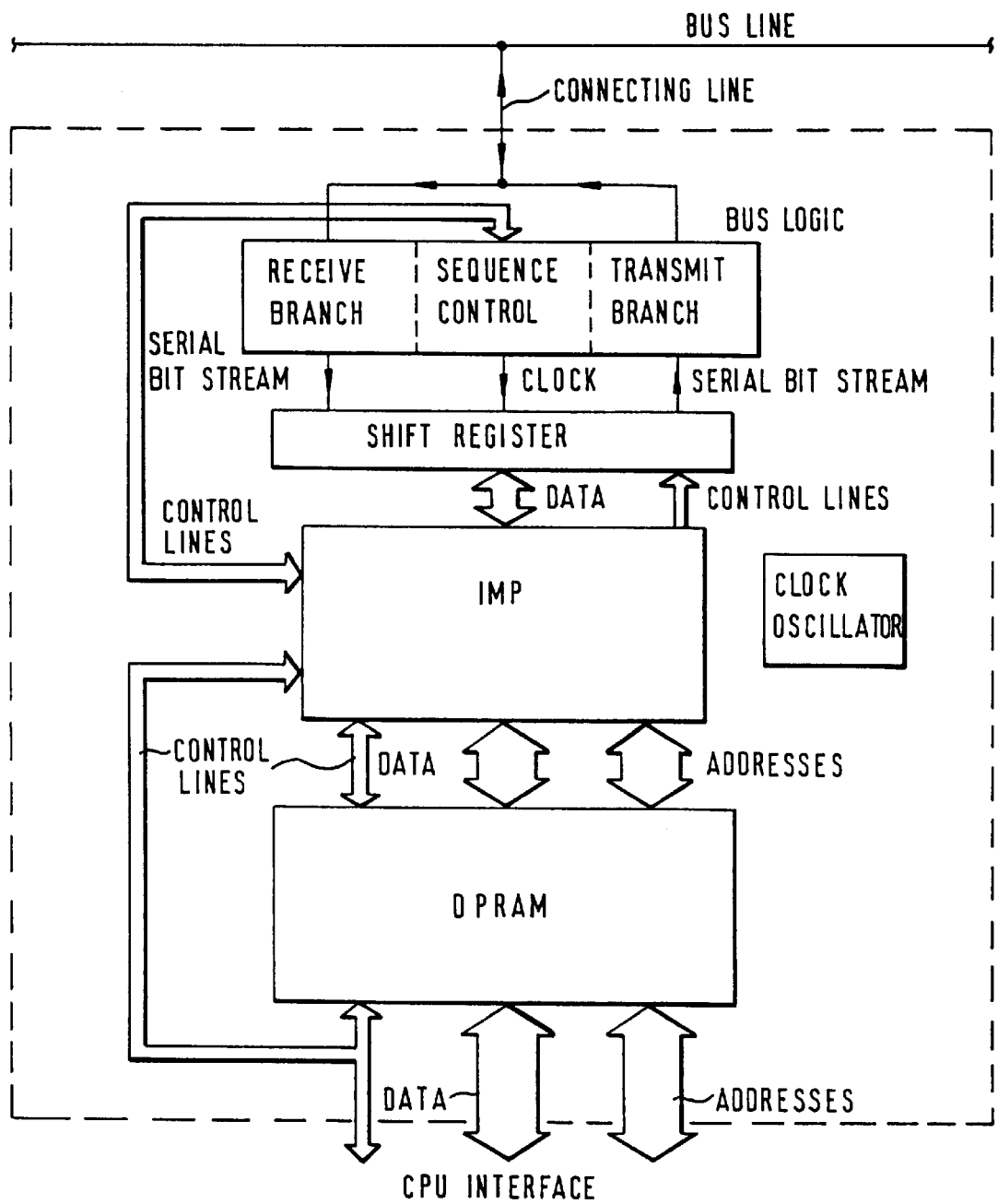
FIG. 11 is a block diagram of the interface locations and modules.

FIG. 11 shows the serial interface module in the form of a block diagram. It is comprised of the following components:

DPRAM

IMP

Serial Shift Register

Bus Logic

Clock Oscillator

The interconnections between the individual components are shown in the block diagram.

7.1.1.2 Priority of Messages

The priority within IMP is determined by the location of the various messages in DPRAM. The priority on the bus (arbitration) is determined by the IDENTIFIER of the message.

The search for the highest-priority message within IMP starts at the lowest DPRAM address.

7.1.1.3 Acceptance Filter

Each message arriving on the bus is tested for acceptance or non-acceptance. For this purpose, the list is checked through in DPRAM which list contains all of the messages which are processed in this IMP. An arriving message is only transferred to DPRAM if its IDENTIFIER is found there and if it should be received there, this being indicated by the RECEIVE/TRANSMIT bit.

7.1.1.4 Queue of Messages to be Transmitted

The CPU writes each message to be transmitted into DPRAM, which is followed by the TRANSMIT-REQUEST bit being set. A search locates the highest-priority message waiting for transmission. Only this message will be considered for transfer to the serial shift register. If the CPU identifies a more important message later, the search process will locate that message and displace the first message. As a result, the messages are transferred according to their assigned priorities and independent of their time of arrival.

7.1.1.5 Queue of Messages Received

When messages received are stored in DPRAM, the INTERRUPT-REQUEST bit is automatically set. Among the messages received, the search locates the message with the highest priority, sending an interrupt to the CPU. If a more important message is stored in DPRAM before the CPU has responded to the interrupt, this higher-priority message will be considered. This ensures that messages are attended to in accordance with their priorities and independent of their time of arrival.

7.1.2 Organization of DPRAM

DPRAM contains DESCRIPTORs (IDENTIFIERs, CONTROL-SEGMENTs) and DATA-FIELDs of all messages to be received or transmitted on the bus by the CPU. Its organization is independent of the protocol specified. The following are possibilities:

- separate storages for incoming and outgoing messages;
- separate storages for DESCRIPTORs and DATA-FIELDS;
- one single storage for all tasks.

In a first embodiment, one storage is proposed for all tasks. The messages can be loaded into the storage equidistantly. However, to save storage space, it is suitable to pack the messages to a length of between three and ten bytes, depending on the DATA-BYTE-COUNT.

Currently, the size of DPRAM is set to 64 bytes. Should the integration cost become less in the future, the storage capacity can be increased. This would make it possible to store a greater number of messages or longer messages (both DATA-FIELD and DESCRIPTOR). Also, substitute messages in the event of missing messages could be stored in DPRAM which would simplify the software in the event of errors.

Figure 27:
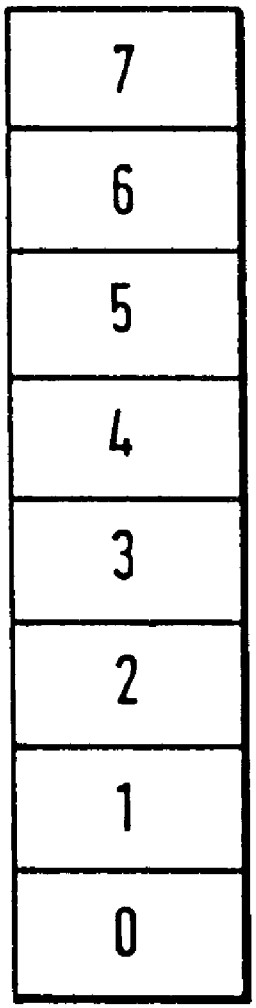
FIG. 27 is a diagram showing CONTROL-SEGMENT organization.

As becomes apparent from the above, DPRAM serves as
- storage which decides simultaneously whether the arriving messages are to be received (ACCEPTANCE-FILTER);
- wait queue for incoming and outgoing messages, ordered by their respective priorities;
- storage for the IMP control registers. (FIG. 27)

7.1.4 Function of DPRAM

7.1.4.1 DATA-BYTE-CODE

In search operations, the DPRAM address pointer first has to point to the start of a message. If DESCRIPTORs and DATA-FIELDs are stored in packed format, the pointer can be moved to the next message by increasing it by $2^{**}$ (DATA-BYTE-COUNT)+2.

To make better use of the storage space available and the messages, several messages may be combined under a common DESCRIPTOR for transmission as one large message. The maximum block size is currently set to eight bytes.

The length of the DATA-FIELD is obtained from the DATA-BYTE-CODE as follows:

DATA-BYTE-COUNT=$2^{**}$ DATA-BYTE-CODE.

7.1.4.2 PENDING

The PENDING bit indicates that either a transmission or an interrupt routine is not yet completed. It is set automatically when a transmission is started on the bus or when the CPU acknowledges an interrupt (loading of interrupt pointer). The PENDING bit is reset automatically on completion of a transmission (whether successful or not). In addition, the PENDING bit is reset under program control by the CPU together with INTERRUPT-REQUEST or on arrival of a new message having the same IDENTIFIER. If the PENDING bit of a message is set, this particular message will not be included in a search.

The PENDING bit enables the CPU programmer to check at the end of the interrupt routine whether another interrupt has destroyed the consistency of a message of several bytes.*** If the PENDING bit continues to be at HIGH on termination of the interrupt routine, this is the confirmation that the DATA-FIELD was processed consistently prior to the arrival of the next message.

| INTERRUPT-REQUEST | PENDING | Effect |
|---|---|---|
| LOW | LOW | no interrupt |
| LOW | HIGH | no interrupt |
| HIGH | LOW | new interrupt |
| HIGH | HIGH | interrupt acknowledgment |

These procedures apply only if INTERRUPT-ENABLE= HIGH. If INTERRUPT-ENABLE is reset to LOW, the PENDING bit is not set with the interrupt acknowledgment of the CPU.

7.1.4.3 INTERRUPT-ENABLE

A set INTERRUPT-ENABLE permits INTERRUPT-REQUESTs to be passed to the CPU in the correct relationship.

If INTERRUPT-ENABLE is not set, the CPU will not be notified of an interrupt action.

7.1.4.4 INTERRUPT-REQUEST

INTERRUPT-REQUEST is automatically set to HIGH whenever a newly received message is loaded into DPRAM, irrespective of the state of INTERRUPT-ENABLE. INTERRUPT-REQUEST is also set if an attempt to repeat a transmission fails (TRANSMISSION-COUNT=HIGH).

7.1.4.5 TRANSMISSION-COUNT

TRANSMISSION-COUNT counts the number of times a transmission has been attempted. Following a successful transmission, TRANSMISSION-COUNT is reset.

| TRANSMISSION-REQUEST | TRANSMISSION-COUNT | Status |
|---|---|---|
| LOW | LOW | no transmission |
| LOW | HIGH | no transmission |
| HIGH | LOW | first transmission attempt |
| HIGH | HIGH | second transmission attempt |

After the second unsuccessful transmission attempt, INTERRUPT-REQUEST will be set to enable the user software to attend to the further handling of this error condition.

7.1.4.6 TRANSMISSION-REQUEST

A set TRANSMISSION-REQUEST bit causes IMP to transmit the corresponding message.

Two different states exist:

(a) RECEIVE/TRANSMIT=LOW (transmit)

Start value after a reset. The message is sent. TRANSMISSION-REQUEST is set to HIGH by the CPU or by an incoming message having its REMOTE-TRANSMISSION-REQUEST bit set.

(b) RECEIVE/TRANSMIT=HIGH (receive)

All messages so identified are in the receive mode. As an exception in this status, by setting TRANSMISSION-REQUEST a message is sent having an empty DATA-FIELD and a set REMOTE-TRANSMISSION-REQUEST.

7.1.4.7 RECEIVE/TRANSMIT

RECEIVE/TRANSMIT determines the direction of data transfer.

(a) RECEIVE/TRANSMIT=LOW (transmit)

Start value following a reset. The DATA-FIELDS in DPRAM are write-protected for incoming messages if RECEIVE/TRANSMIT is set to LOW. The messages are activated by TRANSMISSION-REQUEST HIGH.

However, there is one exception:

If REMOTE-TRANSMISSION-REQUEST=HIGH in an incoming message, TRANSMISSION-REQUEST of the pertinent CONTROL-SEGMENTs is set to HIGH although RECEIVE/TRANSMIT=LOW. TRANSMISSION-REQUEST is the only bit which is changed in this operation; all other bits continue to be write-protected. This procedure permits other bus users to request messages.

(b) RECEIVE/TRANSMIT=HIGH (receive)

The incoming messages are transferred to the appropriate DATA-FIELD. On each message transfer, INTERRUPT-REQUEST is automatically set to HIGH.

7.2 CPU-DPRAM Data Exchange

7.2.1 Synchronization Problem

DATA-FIELDs comprised of several bytes can be exchanged in dependence on the application without consideration of the synchronous mode of operation. However, if it is desired to process the DATA-FIELDs synchronously, an appropriate synchronization has to be provided. To keep hardware cost low, a software synchronization is currently proposed. Applying the cycle-stealing technique, the CPU gains access to DPRAM with priority over all other access attempts.

7.2.2 Asynchronous Operation

The CPU uses DPRAM as an extension to RAM. No further transfer instructions are required for this purpose. Messages received are simply written into DPRAM, thereby overwriting the previous messages. Transfers are started by the CPU by setting TRANSMISSION-REQUEST in the CONTROL-SEGMENT of the DATA-FIELD to be transferred. TRANSMISSION-REQUEST can also be set by remote CPUs by means of a REMOTE-TRANSMISSION-REQUEST.

7.2.3 Software Synchronization

7.2.3.1 Testing a Sequence Number

If the transmitting CPU uses a byte of the DATA-FIELD as a sequence number, incrementing it prior to each setting of the TRANSMISSION-REQUEST bit, the receiving CPU, after having processed the data in the DATA-FIELD, can check whether the sequence number has changed. If it has, the receiving CPU has to repeat part of the processing using the new data.

7.2.3.2 Testing the INTERRUPT-REQUEST Bit

Newly arriving messages automatically set the INTERRUPT-REQUEST bit in the corresponding CONTROL-SEGMENT. Even if the CPU is not notified of an interrupt because of INTERRUPT-ENABLE=LOW, INTERRUPT-REQUEST will be reset prior to each processing of the message. After processing, it will be checked whether it has been set again in the meantime.

7.2.3.3 Interrupt-controlled Processing

The receiving CPU can set the INTERRUPT-ENABLE bit in the CONTROL-SEGMENT of the message to be received. Newly incoming messages set the INTERRUPT-REQUEST bit while at the same time automatically resetting the PENDING bit to LOW. The CPU is notified of the most important interrupt. As an acknowledgment, the CPU automatically sets the PENDING bit to HIGH. Before the CPU resets both the INTERRUPT-REQUEST and the PENDING bits on completion of interrupt procedure, it will test the PENDING bit. If it continues to be at HIGH, the next message has not arrived within the interrupt procedure.

7.2.3.4 Block Transfer

To process DATA-FIELDs synchronously, these can be transferred to and from the CPU in blocks. Since this requires double storage, sufficient RAM capacity has to be made available.

a) Transmit Mode

First, TRANSMISSION-REQUEST which serves as a semaphore variable is tested. If it is in the reset state, the DATA-FIELD is transferred from CPU-RAM to DPRAM in bytes. Thereafter, TRANSMISSION-REQUEST is set.

Warning: In this procedure, correct synchronization cannot be guaranteed if a REMOTE-TRANSMISSION-REQUEST bit is set.

b) Receive Mode

Before the actual interrupt routine is started, the DATA-FIELD is transferred to CPU-RAM in blocks. This method reduces the probability of data inconsistency considerably because the critical time period from the entire interrupt handling process is reduced to the block transfer of the DATA-FIELD.

7.2.3.5 Double Receive Buffer

Important messages may occupy two storage locations in DPRAM. In this case, an IDENTIFIER appears twice in DPRAM. The user software can be configured such that it provides for the transfer of incoming messages from a storage location in DPRAM to another location by changing the relevant RECEIVE/TRANSMIT bit, subsequent to the acknowledgment of the interrupt. In this process, one storage location has the RECEIVE/TRANSMIT bit at HIGH, thus indicating its readiness to accept the message, while in the other storage location having the same IDENTIFIER the RECEIVE/TRANSMIT bit is at LOW, whereby the message just received is write-protected.

7.2.4 Hardware Synchronization

If the hardware is to be synchronized, the CPU has to offer fast block transfer with DMA capabilities instead of interruptible processing using semaphores. Access to DPRAM is protected against inconsistent block transfer by means of the CPU and the IMP gaining access alternately under the control of a semaphore bit. Sufficient time has to be allowed between the end of a transfer and the beginning of a new one. In the worst case, IMP has to wait until the CPU has completed a block transfer. Equally in the worst case, the CPU has to wait until IMP has stored a received message in DPRAM and until the next message to be transferred has been loaded into the serial shift register.

7.3 Data Exchange DPRAM-Shift Register

7.3.1 Parallel Control Processes

Figure 28:
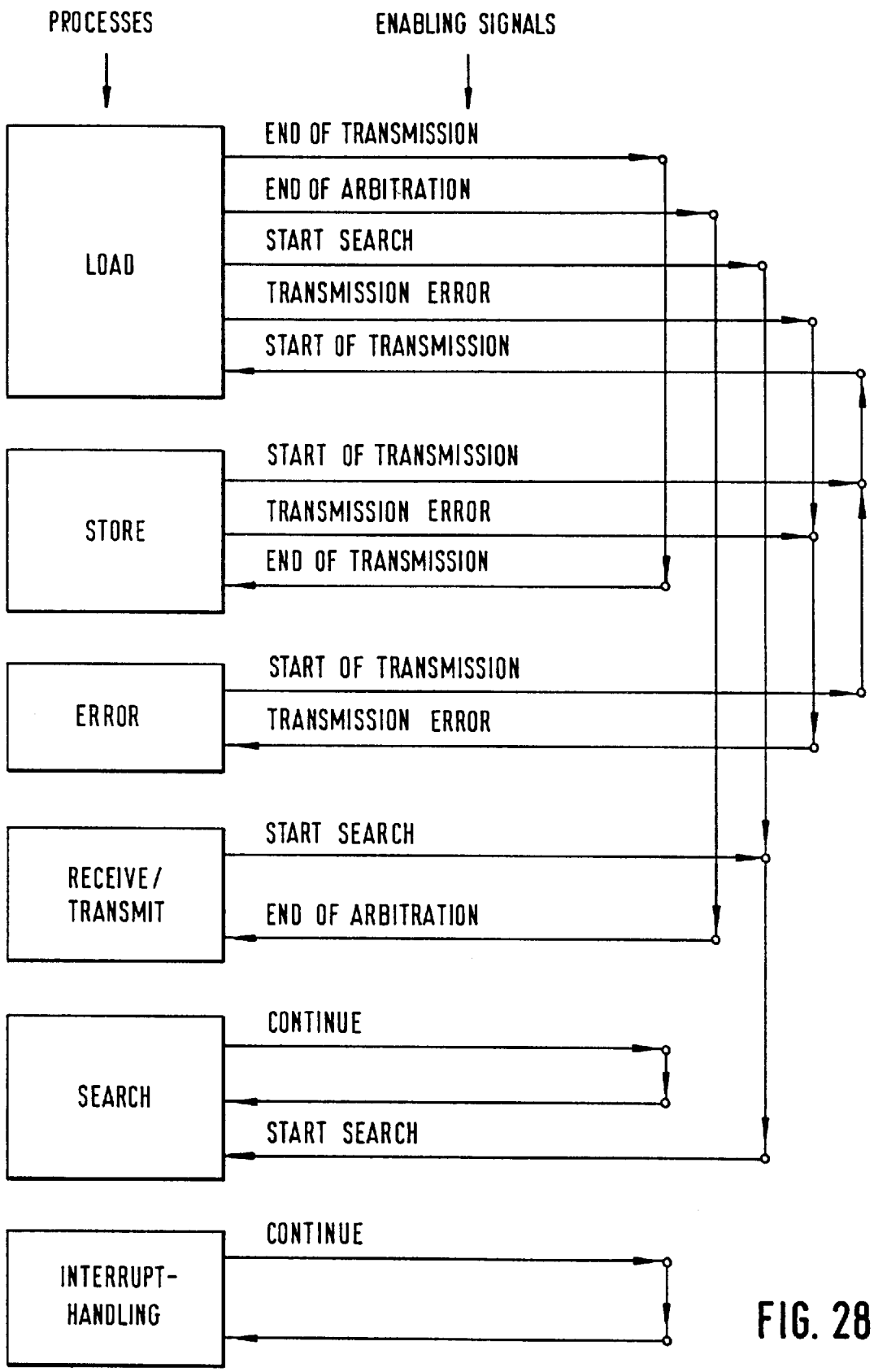
FIG. 28 is a diagram showing the exchange of data between DPRAM and the serial shift register.

The exchange of data between DPRAM and the serial shift register is controlled by several parallel processes the function of which will be described later. A process is initialized and transferred into the active state by an enabling signal. In its active state, each process can issue further enabling signals which are in turn directed to other processes. If an enabling signal is issued, this does not necessarily mean that the source process has to be disabled at the same time. The entire control comprises the processes and enabling signals shown in FIG. 28.

Description of Enabling Signal

End of Transmission:

Signal at the end of a completed error-free transmission. It is set for the duration of a bus clock pulse with a transfer from the status TRANSMIT-END-OF-FRAME to the TEST-INTERMISSION status.

End of Arbitration:

Signal at the end of the arbitration process; after this signal occurs, the access to the bus is controlled (transmit or receive). At the end of the transmission of the IDENTIFIER, a bus clock pulse is set.

Start Search:

Start signal for the SEARCH process to begin anew the search process from the beginning of DPRAM; this signal occurs at the end of the RECEIVE/TRANSMIT process.

Transmission Error:

This error signal is provided for the duration of a bus clock pulse if an error report is transmitted onto the bus.

Start of Transmission:

Start signal for the LOAD process; this signal occurs at the end of the STORE or ERROR process.

Continue:

Restart signal for continuous processes.

In the following sections, the individual processes are described with reference to the conventional control structures as they are used in ALGOL or PASCAL and as they are worked with throughout the computer science literature.

7.3.2 LOAD Process

Figure 29:
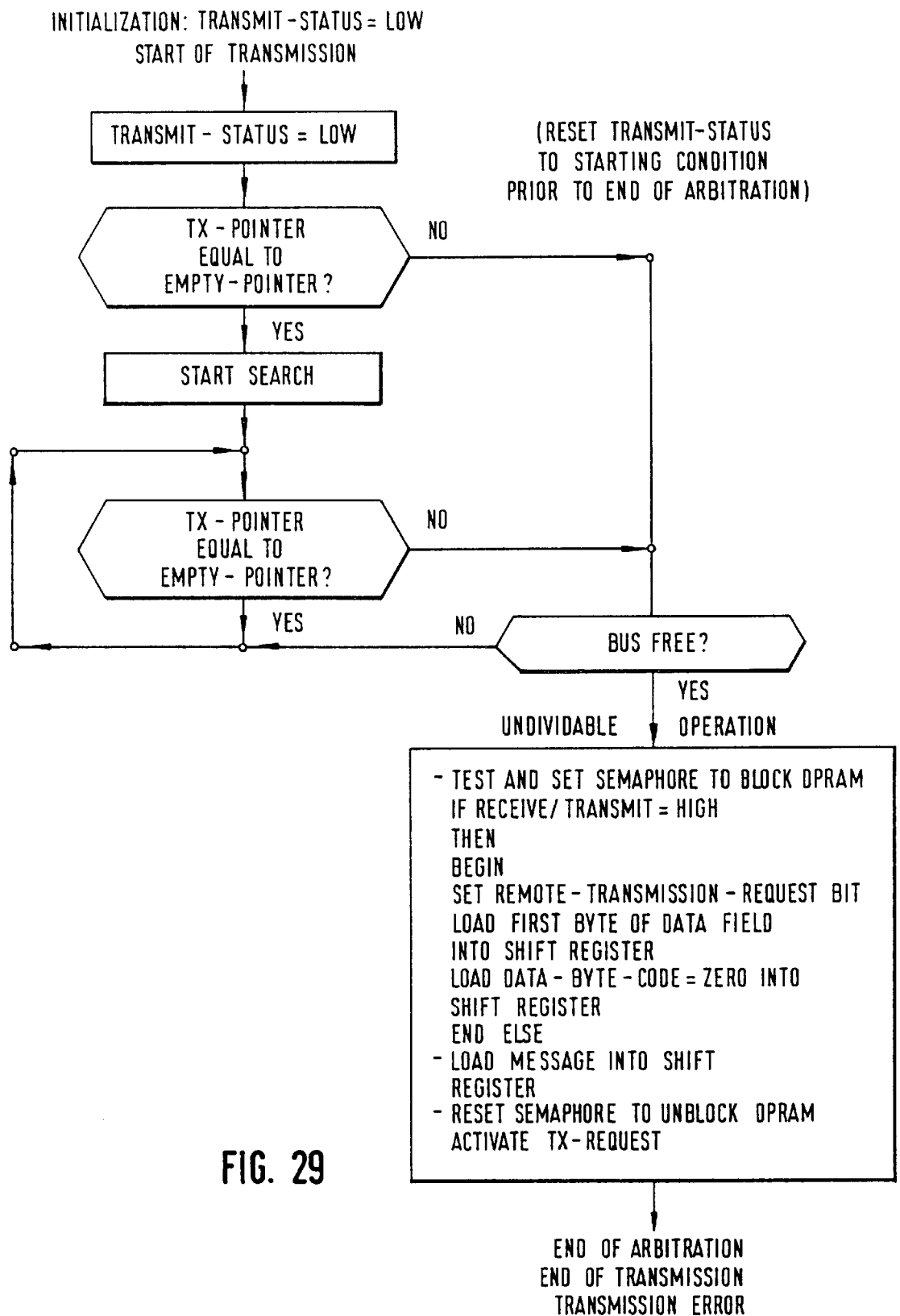
FIG. 29 is a diagram showing the load process.

In the LOAD process, the next message to be transmitted is placed into the serial shift register. If a message is not available for transmission, the SEARCH process is started. Should the SEARCH process locate a second message with a higher priority in the queue of processes to be transmitted while the bus is still busy, this message will displace the previously located message as shown in FIG. 29.

Bus Free:

Bus free is false during transmission of the message segments START-OF-FRAME, IDENTIFIER, CONTROL-FIELD, DATA-FIELD, CRC-FIELD and ACK-FIELD.

TRANSMIT-STATUS:

This has to be set to (HIGH) or reset to (LOW) at the end of the arbitration process.

7.3.3 STORE Process

Figure 30:
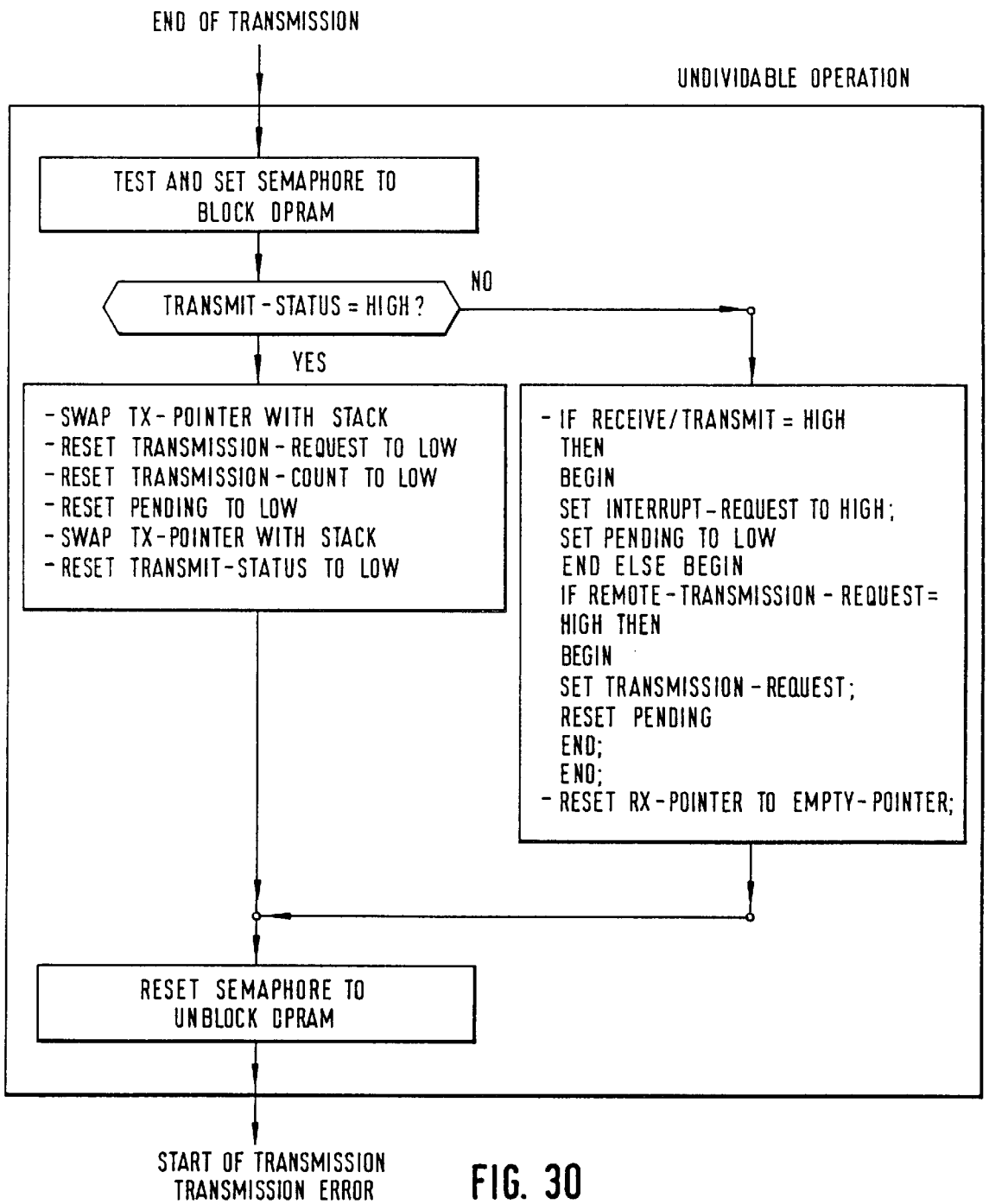
FIG. 30 is a diagram showing the store process.

The STORE process is shown in FIG. 30 and either stores a message received or administers the TRANSMISSION-REQUEST and PENDING bits of messages sent. The end-of-transmission signal occurs only after a successful and error-free transmission. In the event of an error, a transmission error will occur.

7.3.4 ERROR Process

Figure 31:
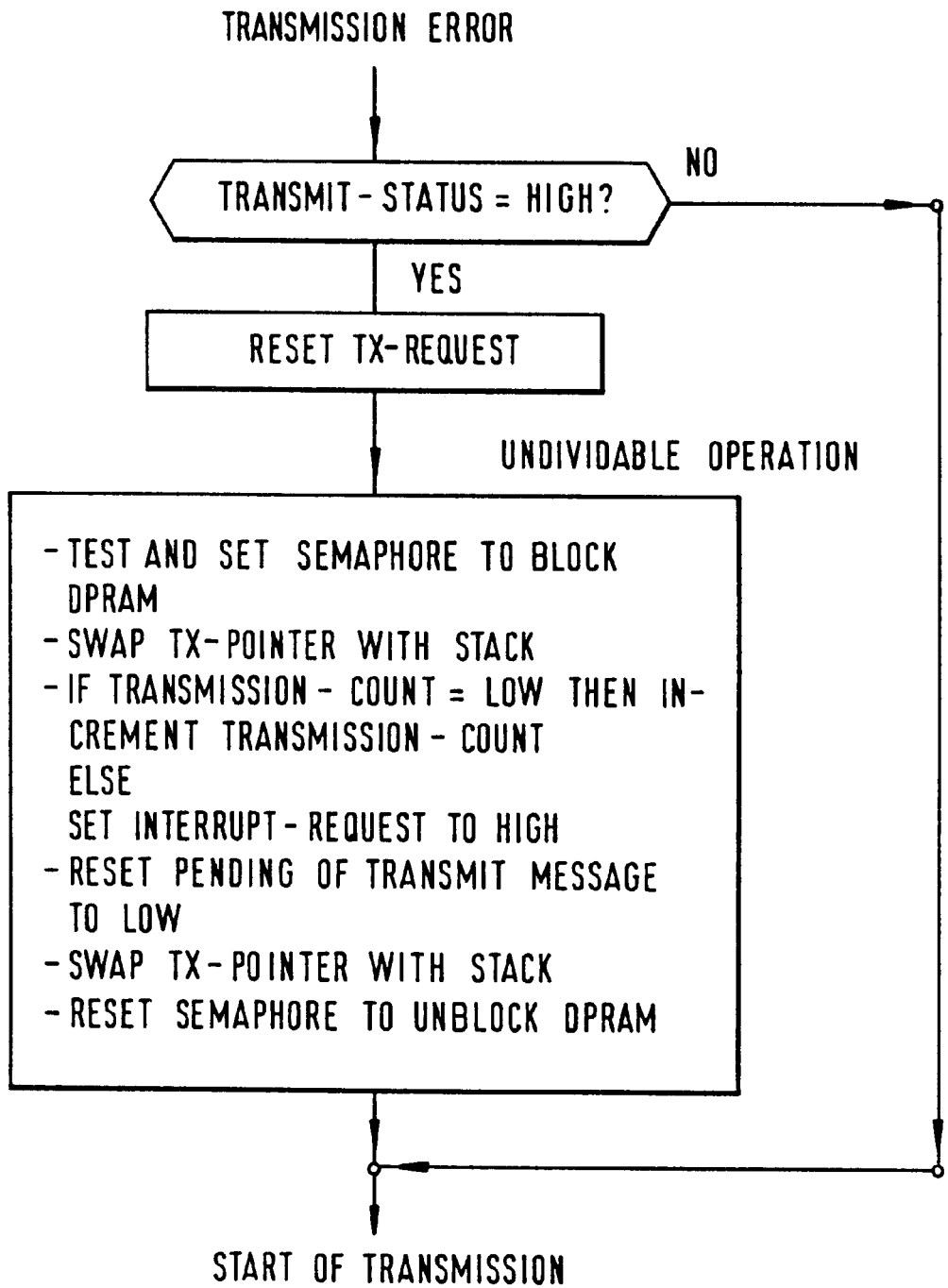
FIG. 31 is a diagram showing the error process.

If an error condition occurs, the ERROR process counts TRANSMISSION-COUNT upwardly or sets INTERRUPT-REQUEST if a second transmission attempt has failed as shown in FIG. 31. In the presence of an error, a message received is not processed further.

7.3.5 RECEIVE/TRANSMIT Process

Figure 32:
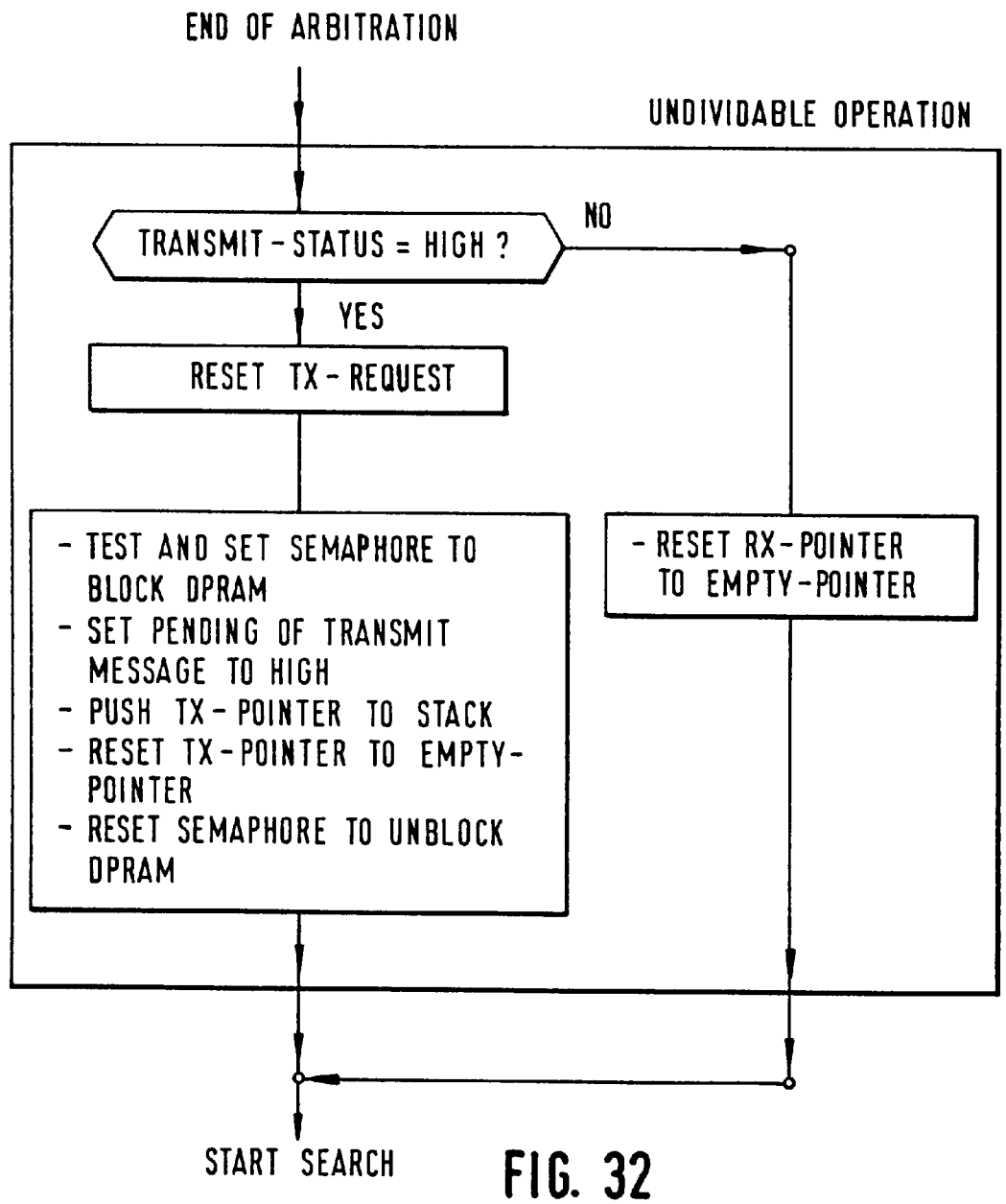
FIG. 32 is a diagram showing the receive/transmit process.

If the arbitration was gained, the PENDING bit of the message just transmitted is set to HIGH and the TX-POINTER corresponding thereto is added to the stack. Depending on the result of the arbitration, the RECEIVE/TRANSMIT process resets the TX-POINTER or the RX-POINTER back to an empty address pointer before the SEARCH process is activated by Start Search as shown in FIG. 32.

7.3.6 SEARCH Process

The SEARCH process searches continuously for DPRAM address pointers regarding:

messages to be transmitted (TX-POINTER), if TRANSMISSION-REQUEST is set;

messages to be received (RX-POINTER), that is, whether the IDENTIFIER received is held in DPRAM; and, messages that are to cause an interrupt request to the CPU, that is, messages having INTERRUPT-REQUEST AND INTERRUPT-ENABLE set.

Figure 33:
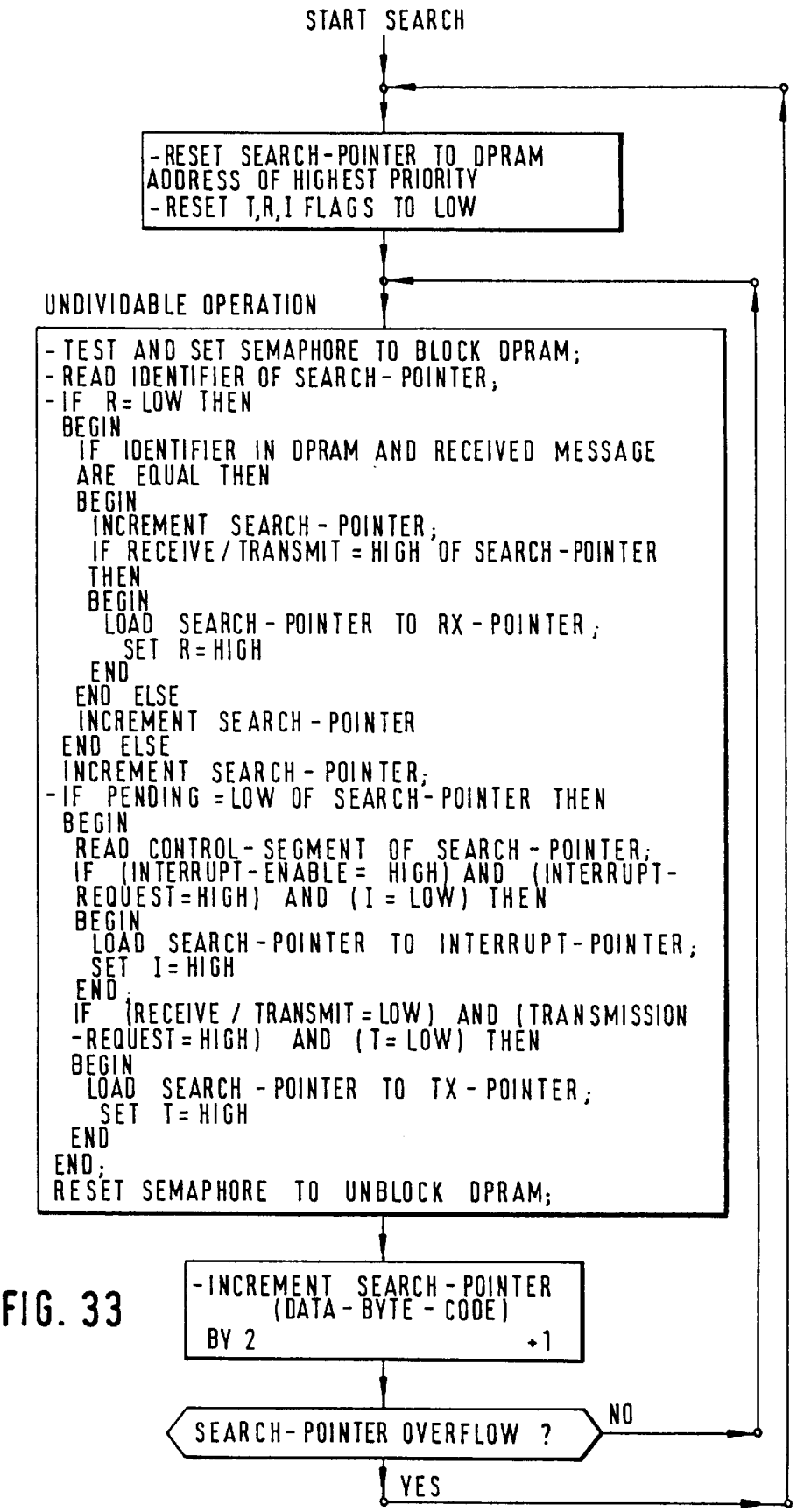
FIG. 33 shows a diagram of the search process for DPRAM address pointers.

Beginning with Start Search, the SEARCH process is reset to the highest-priority message at the beginning of DPRAM, if so required by the real-time processes in the transmission on the bus. Searching an entire message is performed as an undividable operation. In each clock period, the SEARCH process can be suspended by the CPU gaining access to DPRAM by way of cycle stealing, and the SEARCH process can be delayed by one clock period. Upon termination of the undividable operation, higher-priority messages can exclude the SEARCH process from access by the DPRAM until the semaphore variable can be set again by the SEARCH process itself as shown in FIG. 33.

7.3.7 INTERRUPT-HANDLING Process

Figure 34:
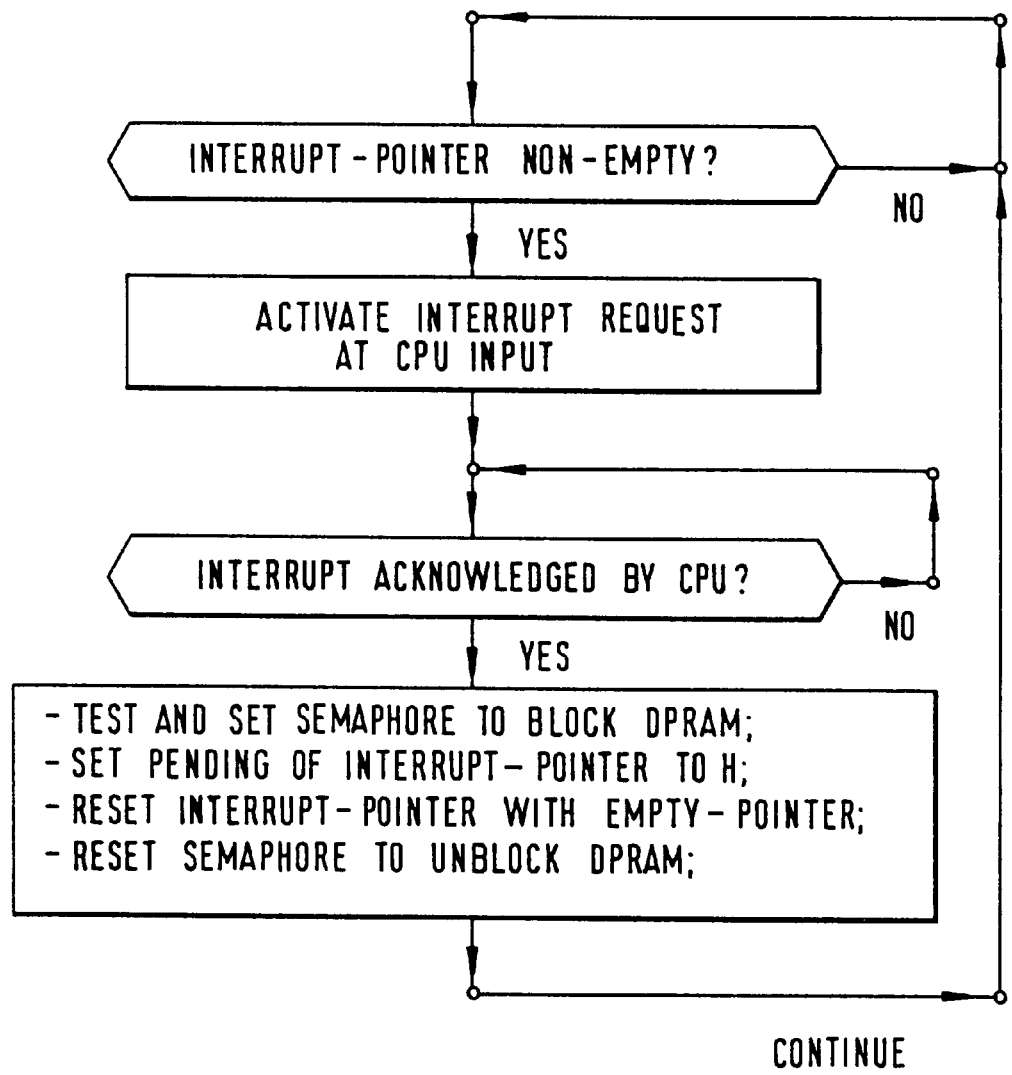
FIG. 34 is a diagram showing the interrupt-handling process.

The INTERRUPT-HANDLING process guides interrupts of messages received or of multiple erroneously transmitted messages to the CPU. The interrupt with the highest priority as predetermined by the arrangement in DPRAM is passed to the CPU. INTERRUPT-HANDLING is a continuous process, running in parallel to other processes. The start value of the interrupt pointer is the empty address pointer as shown in FIG. 34.

7.4 Controlling Access to DPRAM 7.4.1 Access Synchronization

Access to DPRAM is controlled by a semaphore variable. It ensures undividable access to the mutually associated bytes of the DATA-FIELD and of the CONTROL-SEGMENT. Other accesses are blocked until the semaphore variable is reset. This ensures the consistency of DATA-FIELDS which are longer than one byte. Should several processes try to set the semaphore variable at the same instant, the following priority arrangement then applies:

(a) STORE (b) LOAD (c) ERROR (d) INTERRUPT-HANDLING (e) RECEIVE/TRANSMIT (f) SEARCH

The CPU is exempted from the access administration by means of semaphores. For each cycle stealing, the CPU always has priority over all other accesses. It is clear that with this control, the consistency of data with CPU access may be violated. To avoid this, the CPU would also have to be included in the access control with semaphores. However, this would require special instructions for the undividable handling of semaphores which are not available at this time with the CPUs currently in the marketplace.

7.4.2 DPRAM Address Pointers

Access to DPRAM occurs from several sources, the CPU and parallel processes, with the addresses originating from:

CPU Address

EMPTY-POINTER Address pointer pointing to an empty address, that is, an address containing no meaningful messages.

If an address pointer is equal to the EMPTY-POINTER, this is interpreted as no message being present.

SEARCH-POINTER: Address pointer of the SEARCH process.

TX-POINTER: Address pointer pointing to the message to be sent. If no message is to be transmitted, TX-POINTER is equal to EMPTY-POINTER.

RX-POINTER: Address pointer pointing to the message to be received. If no message is to be received, RX-POINTER is equal to EMPTY-POINTER.

INTERRUPT-POINTER: Address pointer pointing to the message making an interrupt request to the CPU. If no interrupt request is present, INTERRUPT-POINTER is equal to EMPTY-POINTER.

The address pointers are processed in the different processes to obtain the DPRAM address under which the data is to be stored or read. The actual DPRAM accesses by means of the address pointers are organized in correspondence to their priorities. Undividable access to several bytes occurs by means of the semaphore variable which blocks the access for all processes except for the process which itself has set the semaphore variable.

7.4.3 Priority Control

Figure 35:
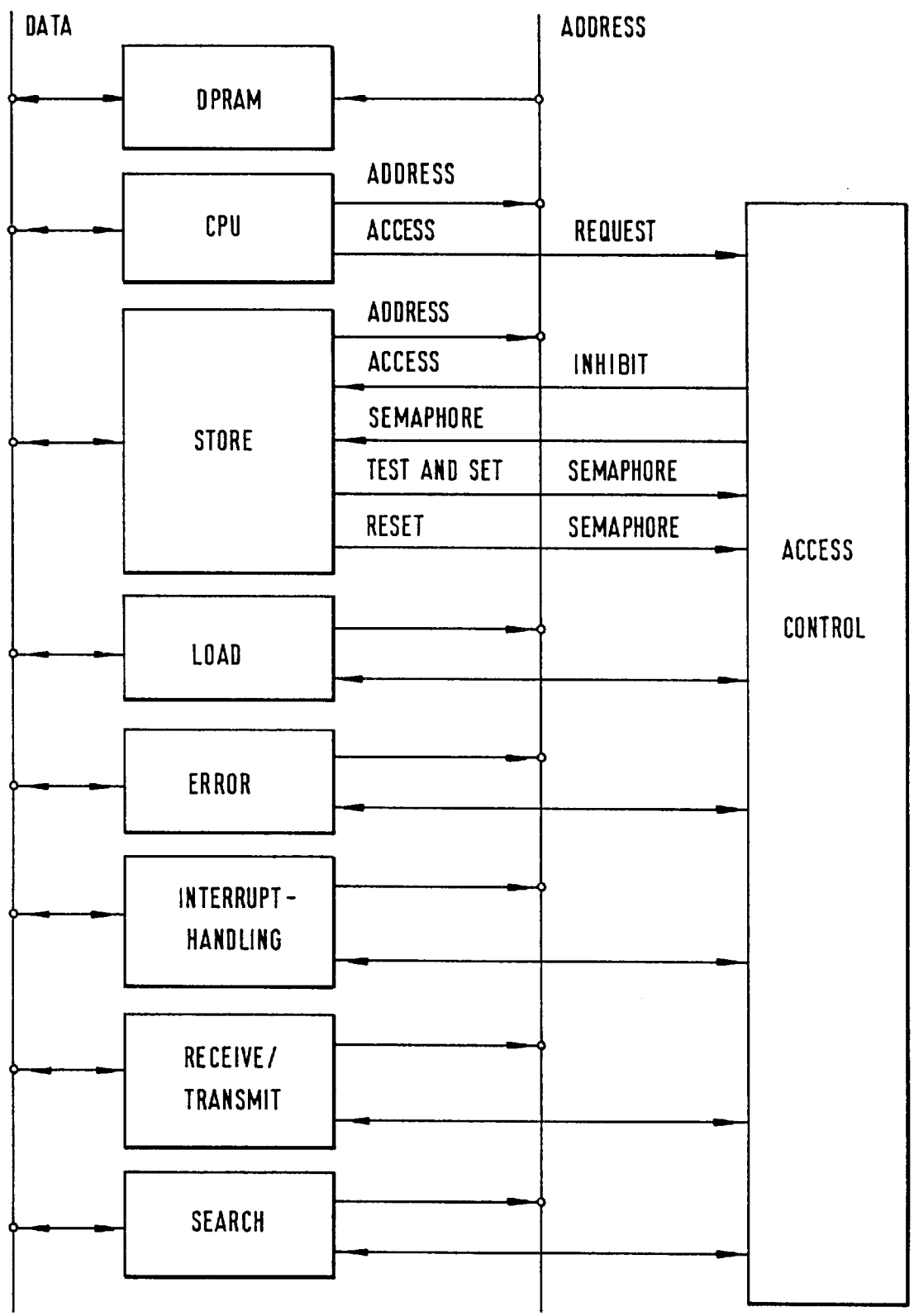
FIG. 35 shows a diagram of a process showing access by the CPU to DPRAM.
Figure 36:
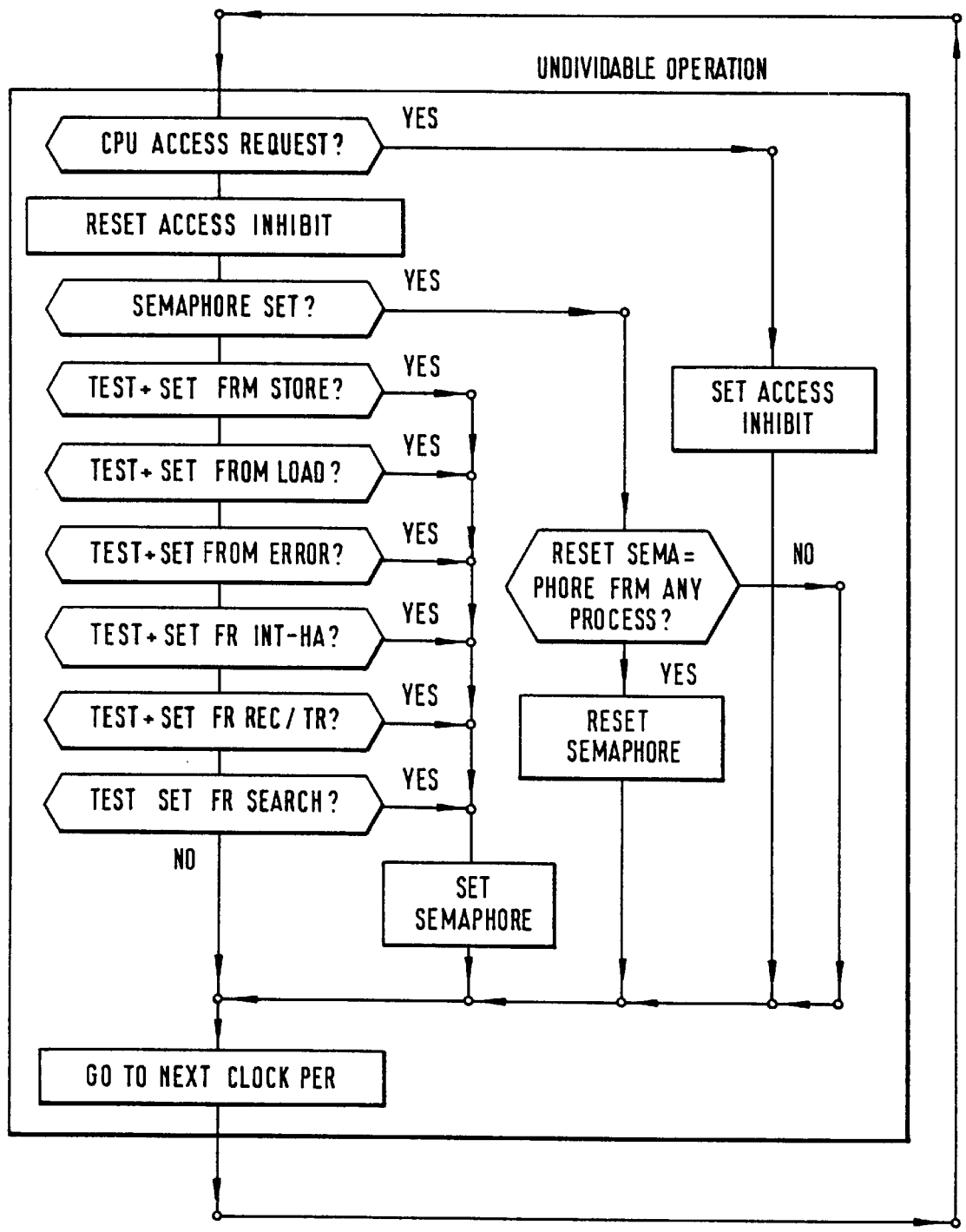
FIG. 36 is a flowchart detailing the embodiment of the access control block shown in FIG. 35.

As already described, access by the CPU to DPRAM and the setting of the semaphore variables are ordered according to priorities. A process may apply its address to the DPRAM address input only if the CPU does not want to gain access (no access request and therefore no access inhibit) and if the semaphore variable is not being used by another process (semaphore=LOW) as shown in FIG. 35. The connections of LOAD, ERROR, INTERRUPT-HANDLING, RECEIVE/TRANSMIT and SEARCH are identical to those for STORE, so that they have not been drawn in detail.

An embodiment of the access control block shown in the above diagram is detailed in the following flowchart which is run through in each clock pulse period. The following abbreviations were used in the above flowchart:

INT-HA for INTERRUPT-HANDLING

REC/TR for RECEIVE/TRANSMIT per for period

It is understood that the foregoing description is that of the preferred embodiments of the invention and that various changes and modifications may be made thereto without departing from the spirit and scope of the invention as defined in the appended claims.

What is claimed is:

1. A method of processing messages in an individual user station connected to a bus line adapted to interconnect a plurality of individual user stations, the method comprising the steps of:

causing each message to include an identifier, which contains information as to the content of the message and determines the priority of the message on the bus line compared to other messages;

comparing the identifier to a list stored in the individual user station and, in response to said comparison, assigning an internal processing priority independent of the priority of the message on the bus line; and, causing the internal processing priority to determine the sequence of messages ready for transmission in the individual user station at every point of time.

2. The method of claim 1, wherein additional data is assigned to the list.

3. The method of claim 2, wherein said data is the transmission status.

4. The method of claim 1, wherein error-laden transmissions are detected and registered.

5. The method of claim 4, wherein the transmission is repeated when an error occurs.

6. The method of claim 5, wherein, after a predetermined number of erroneous transmissions, the repeat of the transmission is stopped and an interrupt request is triggered.

7. The method of claim 1, wherein the list contains an information relative to the transmission requests which is determined by the station itself.

8. A method of processing messages in an individual user station connected to a bus line adapted to interconnect a plurality of individual user stations, the method comprising the steps of:

causing each message to include an identifier, which contains information as to the content of the message and determines the priority of the message on the bus line compared to other messages;

comparing the identifier to a list stored in the individual user station and, in response to said comparison, assigning an internal processing priority independent of the priority of the message on the bus line;

performing a search process to identify a first message which has the highest priority and only considering said first message which has the highest priority and only considering said first message for transmission on the bus line; and, if said search process later identifies a second message having a higher priority than said first message, then said second message displaces said first message, so that the internal processing priority determines the sequence of messages ready for transmission in the individual user station at every point in time.

9. The method of claim 8, wherein additional data is assigned to the list.

10. The method of claim 9, wherein said data is the transmission status.

11. The method of claim 8, wherein error-laden transmissions are detected and registered.

12. The method of claim 11, wherein the transmission is repeated when an error occurs.

13. The method of claim 12, wherein, after a predetermined number of erroneous transmissions, the repeat of the transmission is stopped and an interrupt request is triggered.

14. The method of claim 8, wherein the list contains an information relative to the transmission requests which is determined by the station itself.

15. A method of processing messages in an individual user station connected to a bus line of a data processing arrangement of a motor vehicle, the bus line being adapted to interconnect a plurality of individual user stations installed on the motor vehicle, the method comprising the steps of:

causing each message to include an identifier, which contains information as to the content of the message and determines the priority of the message on the bus line compared to other messages;

comparing the identifier to a list stored in the individual user station and, in response to said comparison, assigning an internal processing priority independent of the priority of the message on the bus line; and, causing the internal processing priority to determine the sequence of messages ready for transmission in the individual user station at every point of time.

16. A method of processing messages in an individual user station connected to a bus line of a data processing arrangement of a motor vehicle, the bus line being adapted to interconnect a plurality of individual user stations installed on the motor vehicle, the method comprising the steps of:

causing each message to include an identifier, which contains information as to the content of the message and determines the priority of the message on the bus line compared to other messages;

comparing the identifier to a list stored in the individual user station and, in response to said comparison, assigning an internal processing priority independent of the priority of the message on the bus line;

performing a search process to identify a first message which has the highest priority and only considering said first message which has the highest priority and only considering said first message for transmission on the bus line; and, if said search process later identifies a second message having a higher priority than said first message, then said second message displaces said first message, so that the internal processing priority determines the sequence of messages ready for transmission in the individual user station at every point in time.

* * * * *